(12) United States Patent
Torii

(10) Patent No.: US 7,546,365 B2
(45) Date of Patent: Jun. 9, 2009

(54) NETWORK DEVICE MANAGEMENT SYSTEM AND METHOD OF CONTROLLING SAME

(75) Inventor: Minoru Torii, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 848 days.

(21) Appl. No.: 10/421,796

(22) Filed: Apr. 24, 2003

(65) Prior Publication Data

US 2003/0204590 A1  Oct. 30, 2003

(30) Foreign Application Priority Data

Apr. 30, 2002  (JP) ............................... 2002-129329
Apr. 30, 2002  (JP) ............................... 2002-129330

(51) Int. Cl.
*G06F 15/173* (2006.01)
*G06F 11/00* (2006.01)
*G06F 17/40* (2006.01)
*G06F 3/00* (2006.01)

(52) U.S. Cl. .................... 709/224; 714/20; 702/187; 710/18; 719/318

(58) Field of Classification Search .......... 709/219, 709/223, 224, 226, 204–207, 211; 719/311, 719/313, 315, 322, 317, 318; 714/20; 702/187; 710/18, 19, 25
See application file for complete search history.

(56) References Cited

U.S. PATENT DOCUMENTS

| 4,811,249 | A | * | 3/1989 | Marsh ......................... 702/187 |
| 4,972,367 | A | * | 11/1990 | Burke .......................... 707/10 |
| 5,537,550 | A | * | 7/1996 | Russell et al. ................ 709/224 |
| 5,592,660 | A | * | 1/1997 | Yokota et al. ................... 707/8 |
| 5,638,508 | A | * | 6/1997 | Kanai et al. .................... 714/20 |
| 5,638,514 | A |   | 6/1997 | Yoshida et al. ........... 395/200.11 |
| 5,796,633 | A | * | 8/1998 | Burgess et al. .............. 702/187 |
| 5,872,966 | A | * | 2/1999 | Burg .......................... 719/313 |
| 6,182,134 | B1 |  | 1/2001 | Collins et al. ............... 709/224 |
| 6,732,124 | B1 | * | 5/2004 | Koseki et al. ................ 707/202 |
| 7,239,410 | B2 | * | 7/2007 | Matsueda .................. 358/1.15 |

(Continued)

FOREIGN PATENT DOCUMENTS

JP    8-036017    2/1996

(Continued)

OTHER PUBLICATIONS

Rose, M.T., "The Simple Book: An Introduction to Network Management", (second edition), Prentice-Hall, Inc., 1996.

*Primary Examiner*—Kevin Bates
*Assistant Examiner*—Gregory G Todd
(74) *Attorney, Agent, or Firm*—Fitzpatrick, Cella, Harper & Scinto

(57) ABSTRACT

Disclosed are a network device management system and method of controlling the same for simplifying the operation of a client application and making it possible to reduce traffic in process-to-process communication. By way of inter-process communication, a client apparatus requests a server apparatus for log information relating to a device connected on a network. Using a prescribed protocol, the server apparatus acquires the device-related log information and transmits this information to the client apparatus by inter-process communication. The client apparatus stores the device-related log information acquired from the server apparatus and, based upon newly acquired log information, changes a display of device-related log information and print job status information.

12 Claims, 17 Drawing Sheets

U.S. PATENT DOCUMENTS

| | | | |
|---|---|---|---|
| 7,249,150 B1 * | 7/2007 | Watanabe et al. | 707/200 |
| 2002/0107958 A1 * | 8/2002 | Faraldo, II | 709/224 |
| 2002/0138762 A1 * | 9/2002 | Horne | 713/201 |
| 2003/0061322 A1 | 3/2003 | Igarashi et al. | 709/223 |
| 2006/0155825 A1 | 7/2006 | Torii | 709/223 |

FOREIGN PATENT DOCUMENTS

| | | |
|---|---|---|
| JP | 11-249847 | 9/1999 |
| JP | 11-282818 | 10/1999 |
| JP | 2000-132476 | 11/2000 |
| JP | 2001-282656 | 10/2001 |
| JP | 2001-356974 | 12/2001 |
| JP | 2002-041274 | 2/2002 |
| JP | 2001-184281 | 7/2002 |

* cited by examiner

NETWORK DEVICE MANAGEMENT SYSTEM AND METHOD OF CONTROLLING SAME

FIELD OF THE INVENTION

This invention relates to a computer network and, more particularly, to a network device management apparatus having network management software for managing various devices connected on a network, and to a method of controlling this apparatus.

BACKGROUND OF THE INVENTION

A method that uses a SNMP (Simple Network Management Protocol)/MIB (Management Information Base) is known as a method of managing various devices (referred to as "network devices" below) connected on a network. (With regard to the details of SNMP/MIB, see "Introduction to TCP/IP Network Management; Aiming at Practical Management", by M. T. Rose, translated by Takeshi Nishida, published by Toppan Printing Co., Ltd., Aug. 20, 1992, First Edition.)

In accordance with SNMP network management techniques, a network management system includes at least one network management station (NMS), several managed nodes each of which includes an agent, and a network management protocol used in order that a network management station or agent may exchange management information. Using network management software at a network management station, a user can acquire data related to a management target via the network and can change the data by communicating with agent software at the managed node.

A method using FTP (File Transfer Protocol) is available as a method of uploading or downloading a large quantity of data between terminals on the network. FTP is defined by RFC (Request for Comments) 959 as a standard for performing file transfer. Specifically, according to RFC 959, the FTP communication model, data type, file structure, transfer mode and FTP commands, etc., are defined, and file transfer is carried out by establishing two sessions, namely a control session for transferring a control command and a data session for transferring data, between clients and a server.

In general, if status-change information is actively reported from a management target such as a printer, TRAP-PDU is used according to the SNMP protocol. (For the details of the TRAP-PDU structure, see Marshall T. Rose, "This Simple Book", Prentice-Hall, 1991.)

In accordance with the above, TRAP-PDU is employed in a case where status-change information relating to errors such as paper jamming is reported from, e.g., a printer. That is, in a case where an error has occurred in a printer, the printer transmits error information to the network management station by TRAP-PDU. The network management station that has received the error information displays the event, such as occurrence of the error, on a display using characters or figures, thereby making it possible to notify the user of the error information received.

The protocol used when the status of a printer or the like is monitored by such event notification is not limited to the above-mentioned SNMP protocol. For example, with the SNMP protocol, a packet can be received via a specific port by network management software in order to receive TRAP-PDU. There is also a protocol through which any port can be used at receipt of an event by registering event reception ports with the printer.

As mentioned above, a method using FTP (File Transfer Protocol) is available as a method of uploading or downloading a large quantity of data between terminals on the network. FTP is defined by RFC (Request for Comments) 959 as a standard for performing file transfer. Specifically, according to RFC 959, the FTP communication model, data type, file structure, transfer mode and FTP commands, etc., are defined, and file transfer is carried out by establishing two sessions, namely a control session for transferring a control command and a data session for transferring data, between a client and server.

By way of example, FTP is used also in a case where a large quantity of data is sent and received between a network device management system such as an FTP client and a network device such as an FTP server. In this case, the network device management system uses FTP to update or download a large quantity of data, with respect to the network device to be managed, and can acquire resources within the network device or change these resources. Types of resources are font data, calibration data and log information, etc.

In a case where software (network management software) for performing the above-described network device management is used in a decentralized environment, the general practice is to adopt a system configuration that is based upon a client/server system that employs a server application having a network device management function and a client application launched at each terminal.

For example, RFC 1057 RPC (Remote Procedure Call) has been defined as a standard in a case where process-to-process communication is performed between different terminals using a client application and server application. With RPC, a function group that provides a network service is prepared on the server side, and functions provided by the server are called by a client process at a separate terminal on the network in a manner similar to the functions within the local machine.

The flow of process-to-process communication in RPC is as follows: First, the client calls the RPC function, which has been prepared at the server, as a service request directed to the server. At this time, a data packet in which the function calling information has been stored is sent from the client to the server and execution of the client program is suspended. Upon receiving the data packet, the server dispatches the called function, extracts the argument of the function, then executes the service based upon the argument and sends the result back to the client. The client resumes program execution after it has received the result of the function.

It should be noted that XDR (External Data Representation), which is a standard data representation method over a network, is used to send and receive data between a client and server. A conversion from internal data representation to the XDR format is referred to as "serialization", and a conversion from the XDR format to the internal data representation is referred to as "de-serialization". The transceive data created is increased or decreased depending upon the data size of the argument of the function.

In a case where end of a print job by a printer connected via a network is sensed in a client-server-type network device management system, two methods are available, namely a method of reporting print-job change information (event information) from a printer actively, and a method of acquiring log information, which relates to a printing-completed job, periodically using a file transfer protocol such as FTP. The event information or log information is sent and received using process-to-process communication.

However, with the conventional network device management system of the above-described kind, the log-information acquisition essentials, such as the intervals of the log-information acquisition request to the device and the acquisition protocol, differ for every device managed. As a result, the client application based upon the network management software involves a complicated operation.

In a case where the client application based upon the network management software senses a change in the job of a network device, such as the completion of a print job by a managed printer, in the conventional network device management system of the above-described kind, the job-change sensing method is used selectively, such as sensing by acquisition of event information or sensing by acquisition of log information, in accordance with the type of network device managed. This means that the operation of the client application is complicated.

Further, in data communication between a client application and a server application with the conventional network device management system, a large amount of log information is sent and received. A problem that arises is an increase in traffic in process-to-process communication.

SUMMARY OF THE INVENTION

The present invention has been proposed to solve the problems of the prior art and the object thereof is to provide a network device management system and method of controlling the same for simplifying the operation of the client application and making it possible to reduce traffic in process-to-process communication.

According to the present invention, the foregoing object is to provide a network device management system comprising a client apparatus and a server apparatus, wherein the client apparatus includes requesting means for requesting the server apparatus for acquisition of log information relating to a device, storage means for storing the log information relating to the device acquired from the server apparatus, display means for displaying the log information relating to the device, and changing means for changing the displayed log information relating to the device; and the server apparatus includes acquisition means for acquiring log information, which is held by the device, using a prescribed protocol at intervals corresponding to the device, and transmitting means for transmitting log information to the client apparatus.

Further, according to the present invention, the foregoing object is to provide a network device management system comprising a client apparatus and a server apparatus, wherein the server apparatus includes acquisition means for acquiring log information relating to a device, storage means for storing the information acquired by the acquisition means, generating means which, in a case where the information relating to the device has been acquired, is for generating, as change information, a changed part of the information that has been stored in the storage means, and transmitting means for transmitting the change information generated by the generating means to the client apparatus; and the client apparatus includes receiving means for receiving change information transmitted from the transmitting means, and display means for displaying information relating to the device based upon the change information received by the receiving means.

Further, according to the present invention, the foregoing object is to provide a network device management system in which a server apparatus and a client apparatus send and receive information relating to a device using process-to-process communication, wherein the server apparatus includes acquisition means for acquiring the information relating to the device, storage means for storing the information acquired by the acquisition means, generating means which, in a case where the information relating to the device has been acquired, is for generating, as change information, a changed component of the information that has been stored in the storage means, and transmitting means for transmitting the change information generated by the generating means to the client apparatus in a data format in which process-to-process communication is possible; and the client apparatus includes requesting means for requesting the server apparatus for information relating to the device by process-to-process communication, receiving means for receiving change information transmitted from the transmitting means, and display means for displaying information relating to the device based upon the change information received by the receiving means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the invention and, together with the description, serve to explain the principles of the invention.

DETAILED DESCRIPTION OF THE PREFERRED EMBODIMENT

A preferred embodiment of the present invention will now be described in detail in accordance with the accompanying drawings.

A network device management system according to an embodiment of the present invention and its peripheral devices connected via a network will now be described with reference to the drawings.

Figure 1:
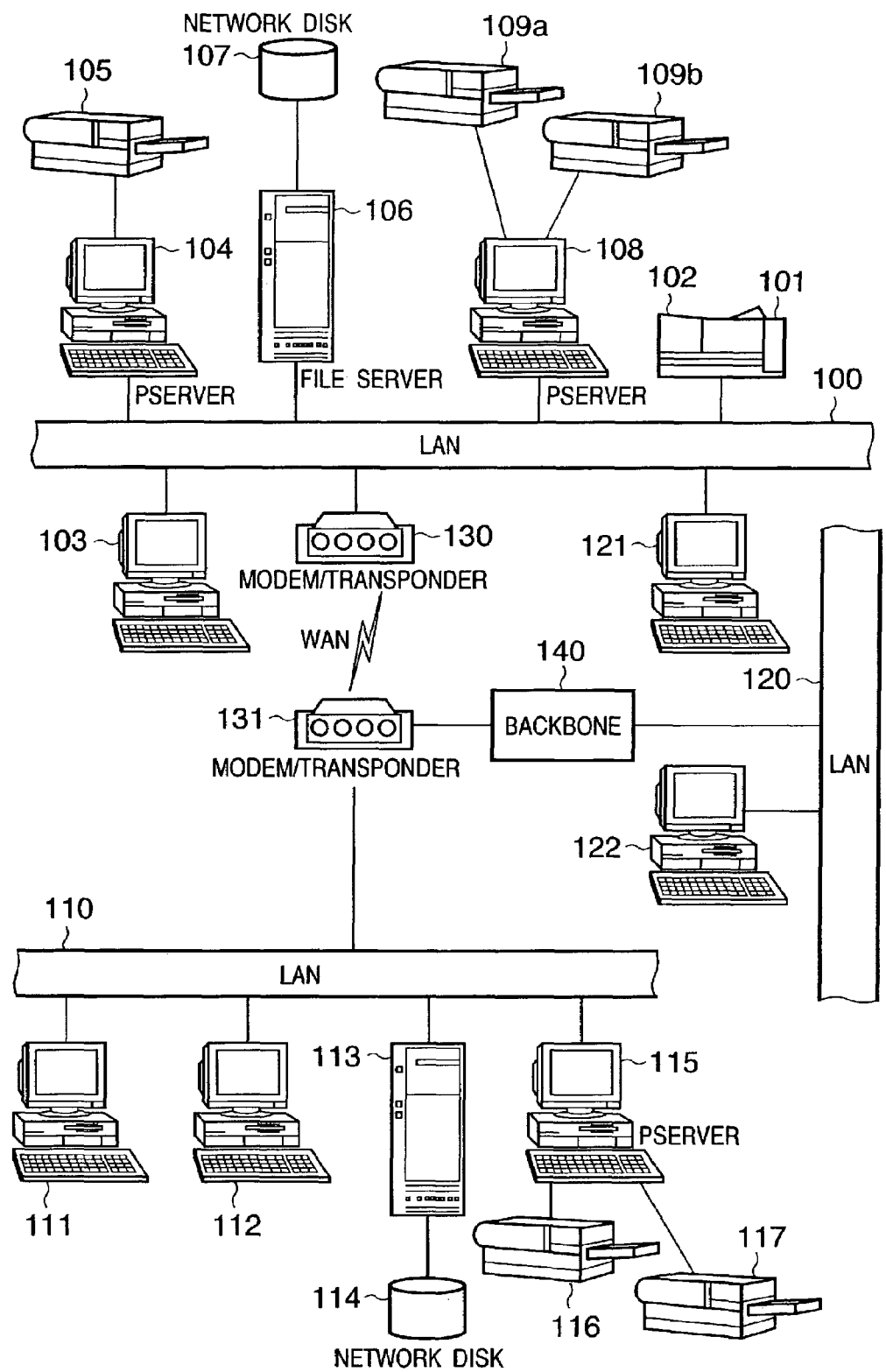
FIG. 1 is a diagram illustrating the configuration of a network device management system according to an embodiment of the present invention, the system including managed devices connected via a network.

FIG. 1 is a diagram illustrating the configuration of a network device management system according to an embodiment of the present invention, the system including managed devices connected via a network.

As shown in FIG. 1, connected to a local-area network (referred to as a "LAN" below) 100 are a printer (device) 102 equipped with a network board 101 and having a open architecture; a personal computer 103 that functions as a client apparatus of the network device management system according to the present invention; a personal computer 104 connected to a printer 105; a file server 106 connected to a network device 107; a printer server 108 connected to printers 109a, 109b; a personal computer 121 that functions as a server apparatus of the network device management system according to the present invention; and a modem/transponder 130.

A personal computer 122 and a backbone 140, which is connected to a modem/transponder 131, are connected to a LAN 120.

Furthermore, the modem/transponder 131, which is also connected to the LAN 120, a personal computer 110, a personal computer 112, a file server 113 connected to a network disk 114, and a personal computer 115, which is connected to printers 116, 117, are connected to a LAN 110.

Figure 2:
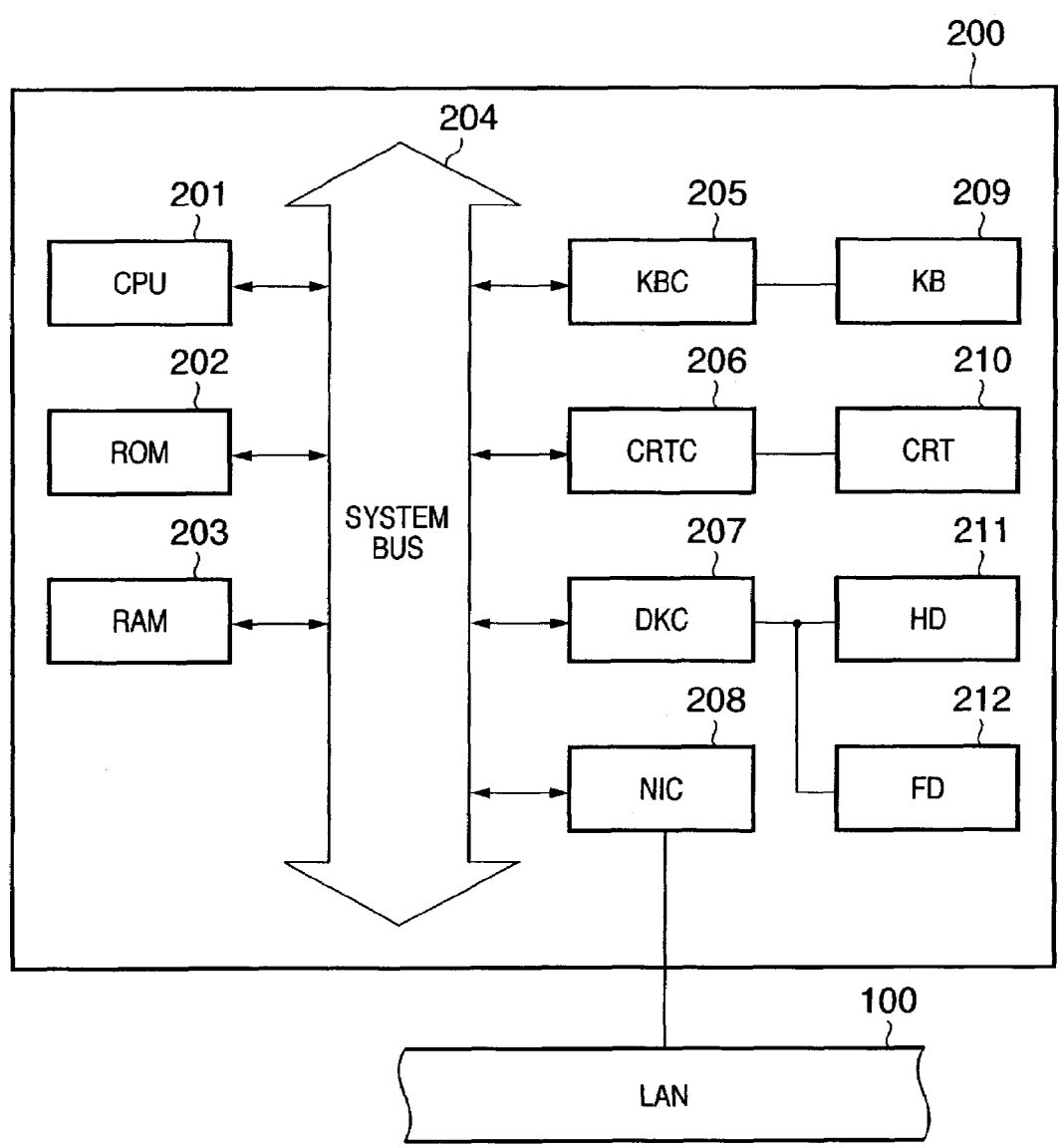
FIG. 2 is a diagram illustrating the structure of personal computers for implementing the network device management system according to the present invention.

FIG. 2 is a diagram illustrating the structure of a personal computer 200, such as the personal computer 103 or 121, for implementing the network device management system according to the present invention. As shown in FIG. 2, the following are connected to the personal computer 200 via a system bus 204: a CPU 201; a ROM 202; a RAM 203; a keyboard controller (CRTC) 205 connected to a keyboard (KB); a CRT controller (CRTC) 206 connected to the CRT 210; a disk controller (DKC) 207 connected to a hard disk (HD) 211 and floppy-disk drive (FD) 212; and a network interface (NIC) connected to the LAN 100.

It should be noted that the personal computer 200 shown in FIG. 2 is not limited to the personal computers 103, 121 in FIG. 1 and that the personal computers 104, 108, 122, 111, 112 and 115 may be similarly constructed. A program related to the network management software according to the present invention, which constitutes the principal part of the operation in the description rendered below, has been stored in the hard disk 211 of the personal computer 200 shown in FIG. 2.

Unless stated otherwise in the entire description that follows, the CPU 201 forms the nucleus of control in terms of the hardware. On the other hand, the nucleus of control in terms of software is the network management software executed by the program stored in the hard disk 211. In this embodiment, Microsoft's Windows 2000 is assumed to be the operating system, though the operating system is not limited to this system and other operating systems may be employed.

The network management program in this embodiment may be supplied in a form stored on a storage medium such as a floppy disk or CD-ROM. In such case, the program that has been stored on the storage medium may be read by the floppy-disk drive 212 shown in FIG. 2 or by a CD-ROM drive, not shown, and may be installed on the hard disk 211.

In the description that follows, the process (client application) of the GUI (Graphical User Interface) portion of the network management software shall be referred to as the "network management software GUI", and the process (server application) of the portion for communication with devices shall be referred to as a "VDC".

Figure 3:
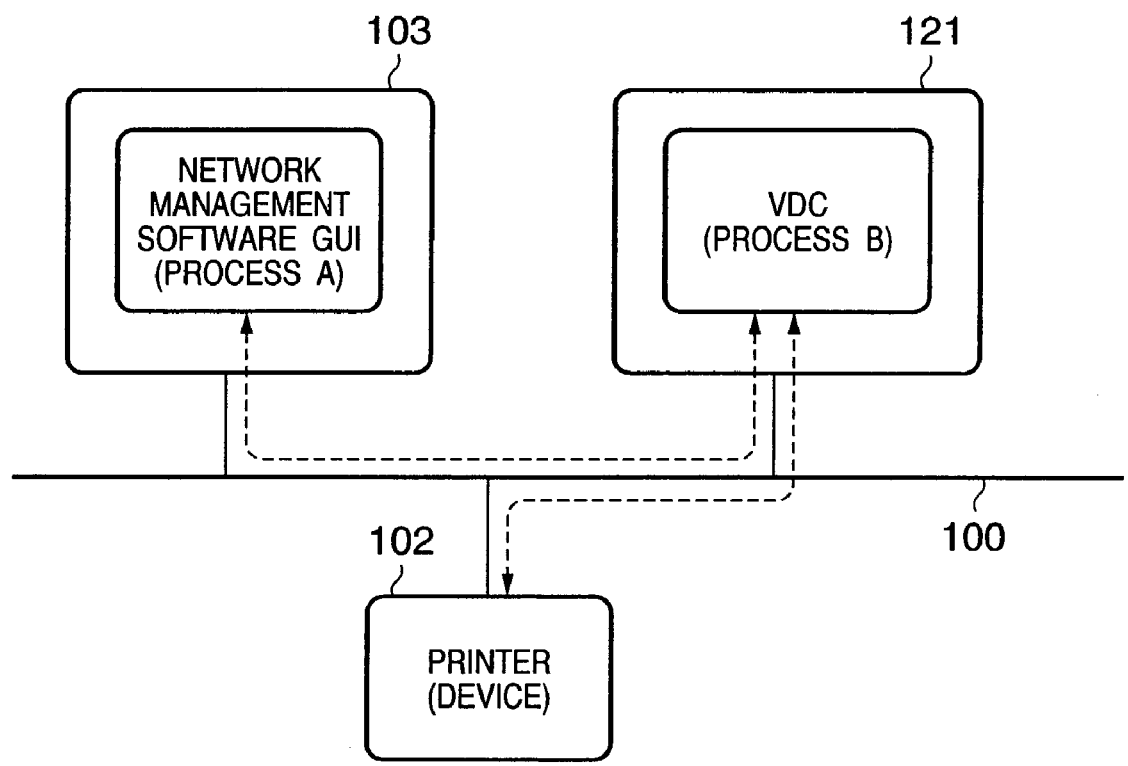
FIG. 3 is a diagram useful in describing process communication between personal computers and a printer connected to a LAN.

FIG. 3 is a diagram useful in describing process communication between the personal computers 103, 121 and the printer 102 connected to the LAN 100. According to this embodiment, as shown in FIG. 3, the process of the network management software GUI executed by the personal computer 103 and the process of the VDC executed by the personal computer 121 are each started up and the printer 102 is managed. More specifically, the network management software GUI performs data communication with the VDC using the function of process-to-process communication, and the VDC communicates with a prescribed management-target device (here the printer 102) using the SNMP protocol. It should be noted that a system may be adopted in which the printer 102 is managed upon launching the network management software GUI and VDC processes at the same personal computer. In this case also processing such as process-to-process communication is the same.

Described next will be processing in a case where the network device management system acquires device-structure information from a device under management.

First, process-to-process communication is performed by the personal computer 103 and network management software GUI using a proxy and the device-structure information desired to be acquired is transmitted to the VDC. Next, the VDC accepts the information, which has been received from the network management software GUI, by a stub and acquires MIB information from the device using the SNMP protocol. The device MIB information thus acquired is transmitted from the stub of the VDC to the proxy using process-to-process communication, and the proxy communicates the information to the network management software GUI by callback. The network management software GUI displays the device-structure information by implementing a bitmap display, etc., based upon the information reported from the proxy by callback.

Described next will be processing in a case where the network device management system sets device-structure information in a device under management.

First, the network management software GUI performs process-to-process communication using a proxy and sends the VDC device-structure information desired to be set. Next, the VDC accepts the information from the network management software GUI by a stub and sets device MIB information in the device. Setting information indicating whether setting of the device has succeeded or failed is transmitted from the stub of the VDC to the proxy using process-to-process communication, and the proxy communicates the information to the network management software GUI by callback. The network management software GUI displays the result of setting the device-structure information by implementing a bitmap display, etc., based upon the information reported from the proxy by callback.

Figure 4:
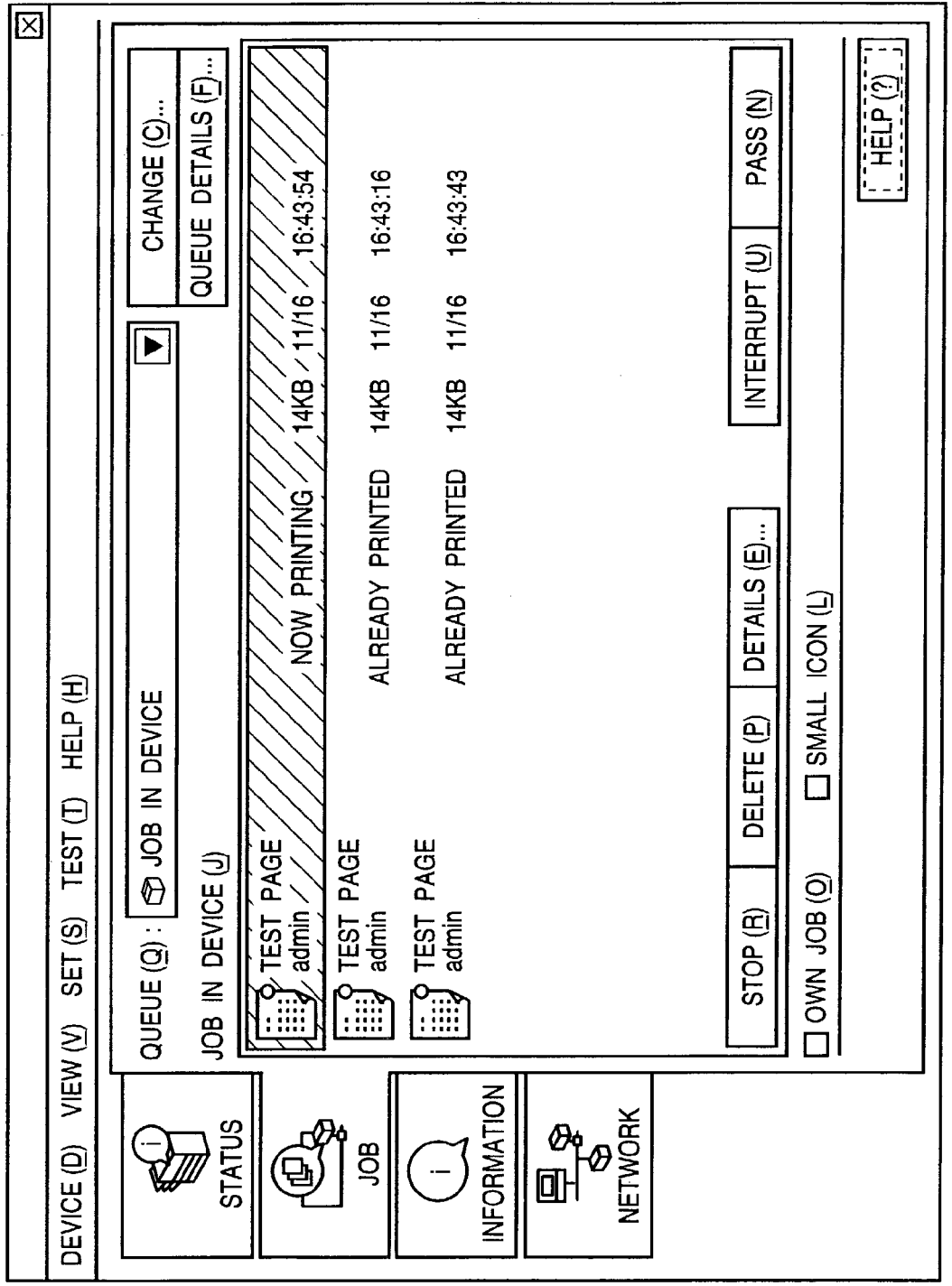
FIG. 4 is a diagram illustrating an example of a screen by which the GUI of network management software displays job information relating to a prescribed managed device.

FIG. 4 is a diagram illustrating an example of a screen by which the network management software GUI displays job information (referred to as "device job information") relating to a prescribed managed device. The network management software GUI performs process-to-process communication using a proxy in order to acquire device job information from the device and transmits a command for acquiring device job information to the VDC. The VDC accepts the command for acquiring the device job information by the stub and acquires job information from the device using a protocol for acquiring device job information, such as a Job MIB protocol or IPP (Internet Printing Protocol), employing, e.g., the SNMP protocol.

Thus, the server apparatus in the network device management system according to the present invention is characterized in that data is transmitted to and received from a device using the SNMP protocol.

Device job information that has been acquired is transmitted from the stub of the VDC to the proxy using process-to-process communication and the information is reported from the proxy to the network management software GUI by callback. On the basis of the device job information reported from the proxy by callback, the network management software GUI displays a list of the device job information using a screen of the kind shown in FIG. 4.

Further, in order to display a change in the status of the device job information in real time, the network management software GUI sends the VDC a command, which is for requesting reporting of event information, by performing process-to-process communication using a proxy. The VDC receives this command for requesting reporting of event information by the stub and registers the information of the network management software GUI (client) as the destination to which the event information is to be reported.

In a case where the VDC has acquired event information from the device under management, or in a case where the VDC has acquired log information indicating completion of a job, such as printing, from the device under management, the VDC, in order to report the information to the client that has been registered as the destination, transmits event information to the proxy as job-status change information from the stub using process-to-process communication. The proxy communicates the received job-status change information to the network management software GUI by callback. The network management software GUI updates the device job information within the list based upon the job-status change information reported by callback.

The network management software GUI acquires the job log information of the device in order to reliably sense the printing-completed status of the job in the printer (device) 102. The VDC reports the job log information acquired from the device to the network management software GUI by callback, and the network management software GUI detects the job, for which printing has ended, from the acquired job log information and presents a display that changes the job status to the printing-completed status.

Figure 5:
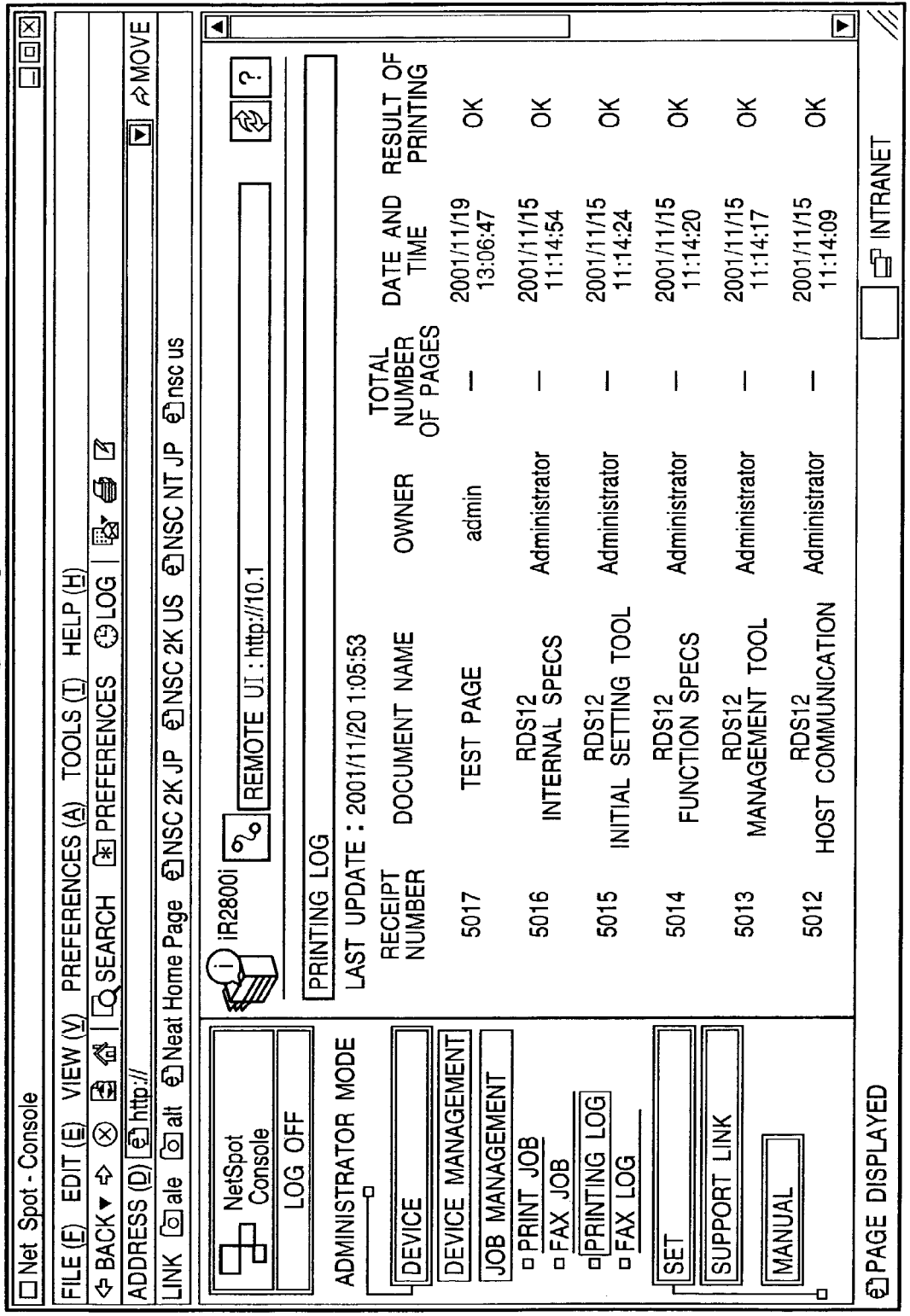
FIG. 5 is a diagram illustrating a screen by which the GUI of network management software displays job log information.

FIG. 5 is a diagram illustrating a screen by which the network management software GUI displays job log information. In order to acquire job log information from a device, the network management software GUI performs process-to-process communication using a proxy and sends the VDC a request for acquisition of job log information. The VDC accepts the request for acquisition of job log information by a stub and acquires the job log information from the device. The VDC reports the job log information acquired from the device to the network management software GUI by callback. The network management software GUI detects, from the acquired job log information, a job acceptance number, a job name, a job owner name, number of print pages, print time and results of printing, etc., and displays a list of information relating to jobs for which printing has been completed.

Thus, the present invention provides a network device management system for managing information, which relates to a device connected on a network, using a client apparatus and a server apparatus. The client apparatus requests the server apparatus for acquisition of device-related log information by process-to-process communication, stores the device-related log information acquired from the server apparatus, displays the device-related log information and changes the displayed device-related log information based on the newly acquired log information. The server apparatus acquires the device-related log information using a prescribed protocol and transmits the requested log information to the client apparatus by process-to-process communication.

Reference will be had to the drawings to describe in detail an operation for acquiring job log information performed by the VDC (server side) constructed as set forth above, an operation for requesting acquisition of job log information performed by the network management software GUI (client side), and a response operation performed by the VDC with respect to the request for acquisition job log information by the network management software GUI.

Figure 6:
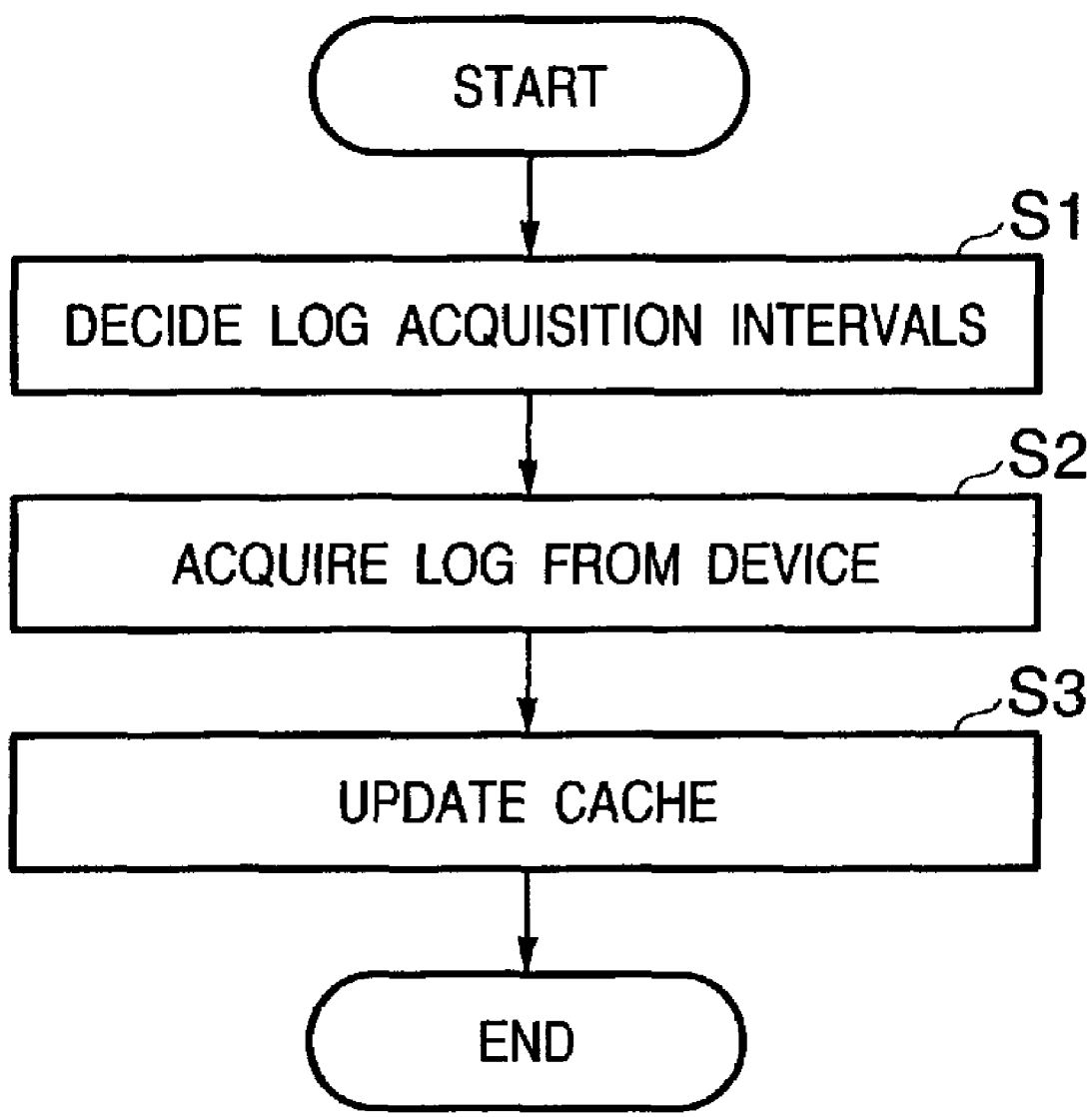
FIG. 6 is a flowchart useful in describing the procedure of an operation for acquiring job log information by a VDC.

FIG. 6 is a flowchart useful in describing the procedure of an operation for acquiring job log information by the VDC. In this embodiment, an operation for acquiring job log information performed by the VDC will be described below. However, the operation for acquiring log information relating to the VDC is not limited to job log information. That is, error log information indicating error information within a device exists besides job log information as the type of log information.

Figure 7:
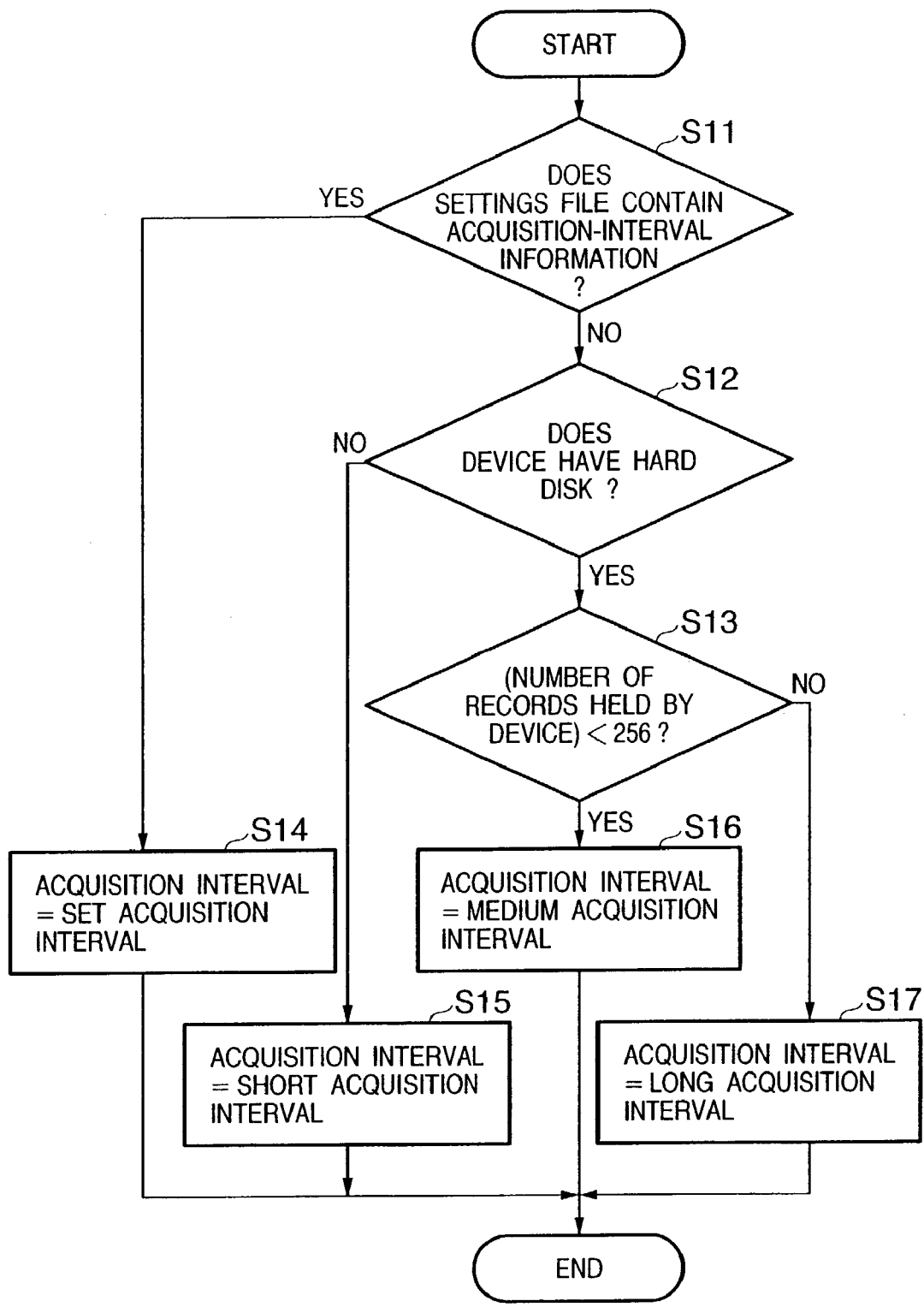
FIG. 7 is a flowchart useful in describing the details of a procedure for deciding intervals at which log information is acquired in a VDC.

As shown in FIG. 6, intervals at which log information is acquired is decided by the VDC (step S1). FIG. 7 is a flowchart useful in describing the details of a procedure for deciding intervals at which log information is acquired in the VDC. In the procedure for deciding the log-information acquisition intervals, as shown in FIG. 7, first it is determined whether a settings file contains acquisition-interval information indicating intervals at which log information is acquired (step S11). The settings file is a file that stores static information referred to by the VDC. If the result of the determination is that the acquisition-interval information exists in the file ("YES" at step S11), then the acquisition interval at which the log information is acquired is made a value that has been read out of the settings file (step S14).

If the result of the determination is that the acquisition-interval information does not exist in the file ("NO" at step S11), on the other hand, then it is determined whether the device that is the target of log information acquisition is equipped with a hard disk (step S12). If the result of the determination is that the device is equipped with a hard disk ("YES" at step S12), then the device is capable of holding a large number of records in dependence upon the size of the hard disk.

If the result of the determination is that the device is not equipped with a hard disk ("NO" at step S12), on the other hand, then the device can hold only a small number of records for the purpose of implementing a log in RAM. Accordingly, in a case where the device does not have a hard disk, the log-information acquisition interval is set to "short" (step S15). For example, in this embodiment, 20 seconds is set as the intervals for acquiring the log information. It should be noted that this value can be tuned at the frequency with which the user uses the device.

Further, if it is found at step S12 that the device is equipped with a hard disk, then it is determined whether the number of records that can be held by the device is less than a fixed number of records (step S13). For example, in this embodiment, it is determined whether the number of records that can be held is less than 256. If the device equipped with the hard disk is a high-end device, then the mounted disk will have a large storage capacity and will be capable of holding a large quantity of log information. If the device is a low-end device, however, then the mounted disk will have a small storage capacity and will be capable of holding a large quantity of log information.

If the result of the above determination is that the number of records that can be held by the device is less than the fixed number (256) ("YES" at step S13), then the acquisition interval is set to "medium" at step S16. For example, in this embodiment, the log-information acquisition interval is set to one minute. It should be noted that this value can be tuned at the frequency with which the user uses the device.

If the result of the above determination is that the number of records that can be held by the device is equal to or greater than the fixed number (256) ("NO" at step S13), then the acquisition interval is set to "long" at step S17. For example, in this embodiment, the log-information acquisition interval is set to three minutes. This value can be tuned at the frequency with which the user uses the device. Thus, as described above, the acquisition interval in this embodiment is set to any one of three levels depending upon whether the device has a hard disk and, if it does, the storage capacity of the hard disk. However, it is possible to adopt an arrangement in which the acquisition interval has a plurality of levels in excess of three.

Thus, with the network device management system according to the present invention, a server apparatus acquires the device-related log information at prescribed acquisition intervals. Further, the acquisition intervals are set in accordance with the number of records that can be held. Furthermore, the acquisition intervals are set depending upon whether the device does or does not have a hard disk.

Figure 8:
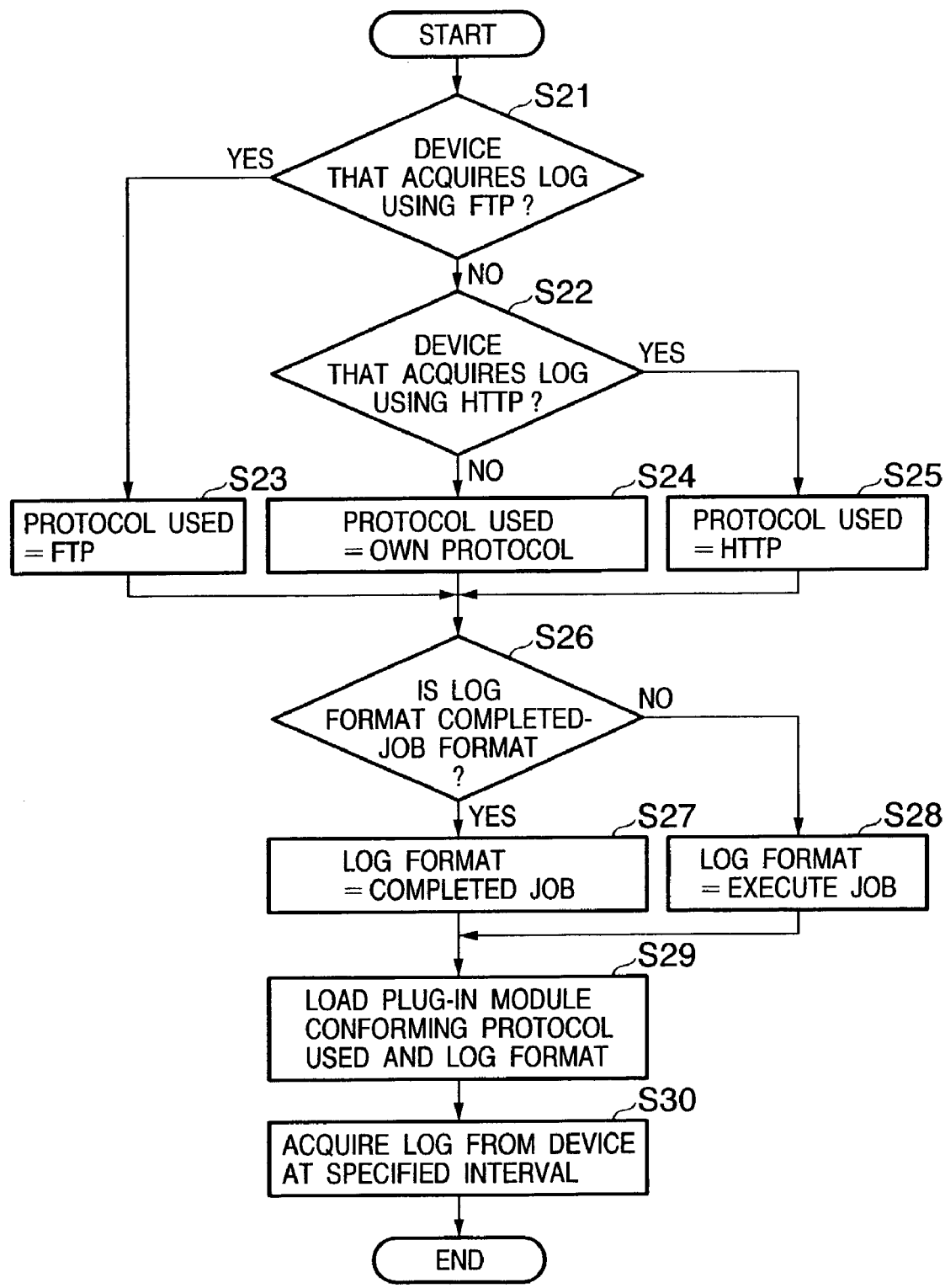
FIG. 8 is a flowchart useful in describing the details of a procedure by which a VDC in acquires log information from a device.

The VDC acquires the log information from the device (step S2) after the log-information acquisition interval is set at step S1. FIG. 8 is a flowchart useful in describing the details of a procedure by which the VDC acquires log information from the device at step S2 in FIG. 6.

As shown in FIG. 8, the VDC determines whether the device is one that acquires log information using the FTP protocol. If the result of the determination is that the FTP protocol is used ("YES" at step S21), then the VDC sets the protocol used to the FTP protocol (step S23). If the result of the determination is that the FTP protocol is not used ("NO" at step S21), then the VDC determines whether there the device in one that acquires log information using the HTTP protocol (step 22).

If the result of the determination is that the HTTP protocol is used ("YES" at step S22), then the VDC sets the protocol used to the HTTP protocol (step S25). If the result of the determination is that the HTTP protocol is not used ("NO" at step S22), then the VDC sets the protocol used to its own protocol (step S24).

After the processing of steps S23, S24 and S25 is executed, the VDC determines whether the format of the log information acquired is the completed-job format (step S26). If the determination is that the format is the completed-job format ("YES" at step S26), then the VDC sets the log format to the completed job (step S27). If the determination is that the format is not the completed-job format ("NO" at step S26), then the VDC sets the log format to execute job (step S28).

In the completed-job format, a record having fields such as job ID, job name, owner name of the job, printing start time, printing end time, results of job end and number of print pages, etc., is defined. In the execute-job format, records having fields such as job ID, job name, owner name of the job, printing start time, job status and number of print pages, etc., is defined. In this embodiment, two types of formats, namely the completed-job format and execute-job format, are handled. However, the format of log information is not limited to these.

Furthermore, after the protocol used and the log format are set, a plug-in module conforming to the protocol used is loaded (step S29). The VDC employs the loaded plug-in module to periodically acquire log information from the device using the log-information acquisition interval described above with reference to the flowchart of FIG. 7 (step S30). That is, the network device management system according to the present invention selects the usable protocol based upon the log function of the device.

Figure 9:
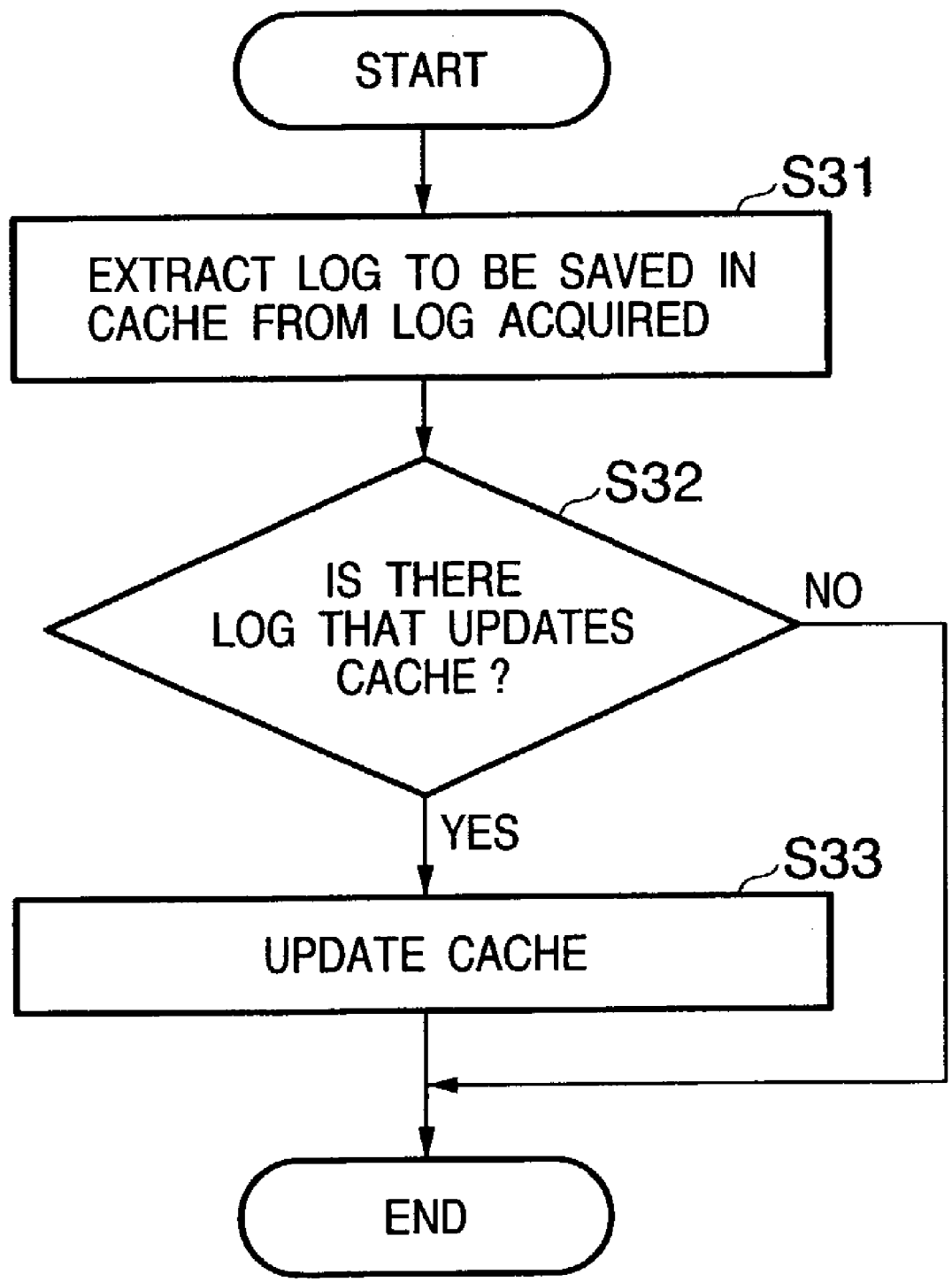
FIG. 9 is a flowchart useful in describing the details of a procedure for saving log information, which a VDC has acquired from a device, in a cache within the VDC.

After the log information is acquired at step S2, a cache of log information held within the VDC is updated (step S3). FIG. 9 is a flowchart useful in describing the details of a procedure for saving log information, which the VDC has acquired from a device, in the cache within the VDC.

The VDC extracts log information, which is to be saved in the cache, from the log information acquired (step S31). Since an ID not selected by the device is present in the job log information as one field item, a record having an ID that has not been saved in the cache is extracted from the acquired log as log information to be saved in the cache. It is determined whether log information that updates the cache exists among the extracted information (step S32). That is, by utilizing the log cache function in the server application of the network management software, only log information that the client application requires is sent and received, thereby making it possible to reduce the traffic of process-to-process communication.

Thus, the network device management system according to the present invention is such that a server apparatus stores acquired log information temporarily and sends a client apparatus only log information that updates log information that has been stored temporarily from among log information acquired anew.

If the result of the determination is that log information to update the cache exists ("YES" at step S32), then the content of the cache is updated (step S33). If the result of the determination is that log information to update the cache does not exist ("NO" at step S32), on the other hand, then processing is exited. In this embodiment, a cache that employs a memory within the VDC is used as means for holding (storing) the log information. However, means for holding the log information is not limited to a cache within the VDC, and it is also possible to use data holding means, such as a database, that exists outside the VDC.

Thus, the network device management system according to the present invention may be so adapted that the same number of records is held by all devices in a case where there are a plurality of devices to be managed. Further, the system may be so adapted that device-related log information is extracted based upon the type of format of the log information held by the device.

Further, even in a case where the number of records that can be held within each device differs, the VDC, by using this cache function, can be dealt with as a virtual device that holds a fixed number of records within the VDC. Further, it is possible to provide a client with a similar operation in any device. Furthermore, since applications developed by third parties exist as clients of the VDC, the efficiency with which client applications are developed is improved by providing a common log information acquisition method in all of the devices. That is, owing to the fact that the server application of the network management software behaves as a virtual device that accommodates disparities among the managed devices, a common log information acquisition method can be provided to a group of devices providing different access methods, and the client application can perform a simple operation in which differences among devices are transparent.

The operation for acquiring log information on the client side will be described next.

Figure 10:
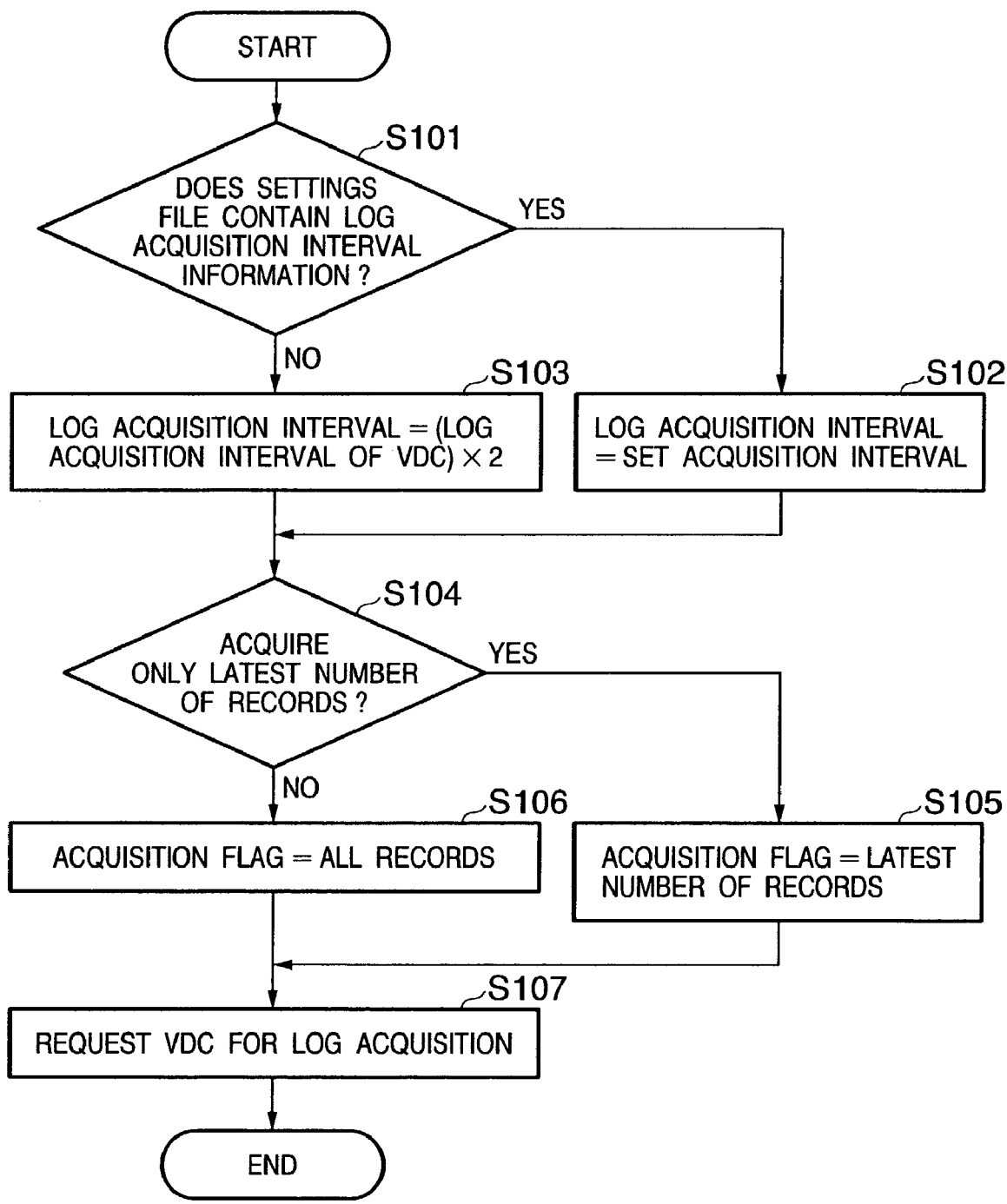
FIG. 10 is a flowchart useful in describing the procedure of an operation for acquiring log information using the GUI (on the client side) of network management software.

FIG. 10 is a flowchart useful in describing the procedure of an operation for acquiring log information using the network management software GUI (on the client side). First, by using the network management software GUI shown in FIG. 5, it is determined whether information relating to the log-information acquisition interval, which is the interval at which the VDC is requested for acquisition of log information, is described in the settings file (step S101).

If the result of the determination is that the information is described in the settings file ("YES" at step S101), then the network management software GUI sets the interval at which the VDC is requested for acquisition of log information to the value that is described in the settings file (step S102). If the result of the determination is that the information is not described in the settings file ("NO" at step S101), on the other hand, then the network management software GUI sets the interval at which the VDC is requested for acquisition of log information to a value greater than the interval at which the VDC acquires the log information (step S103). In this embodiment, the interval at which the log-information acquisition request is issued is made a value that is twice the interval at which the VDC acquires log information in the device. However, as long as the interval at which the network management software GUI requests the VDC for log information is longer than the interval at which the VDC acquires long information in the device, this interval may be made any value.

Next, the VDC determines whether only the latest number of records are to be acquired (step S104). In a case where log information is used in order to change the status of a job as shown in FIG. 4, only the latest number of records for which printing has been completed are necessary. The VDC can be requested to acquire only the necessary number of records in order to reduce the quantity of communication in process-to-process communication. That is, the network device management system according to the present invention acquires only the latest log information of the prescribed record of numbers.

On the other hand, it is necessary to acquire all records in the case of the screen shown in FIG. 5, which displays a list of log information of completed jobs of the device. In this case, since a fixed number of records are being held within the VDC regardless of the device, the same number of records can be displayed for any device. Accordingly, if only the latest number of records are acquired at step S104 ("YES" at step S104), an acquisition flag is set to the latest number of records (step S105). If the latest number of records are not to be acquired ("NO" at step S104), on the other hand, then the acquisition flag is set to all records (step S106). After the acquisition flag is set at step S105 or S106, a call is made to the VDC to request acquisition of log information (step S107).

Figure 11:
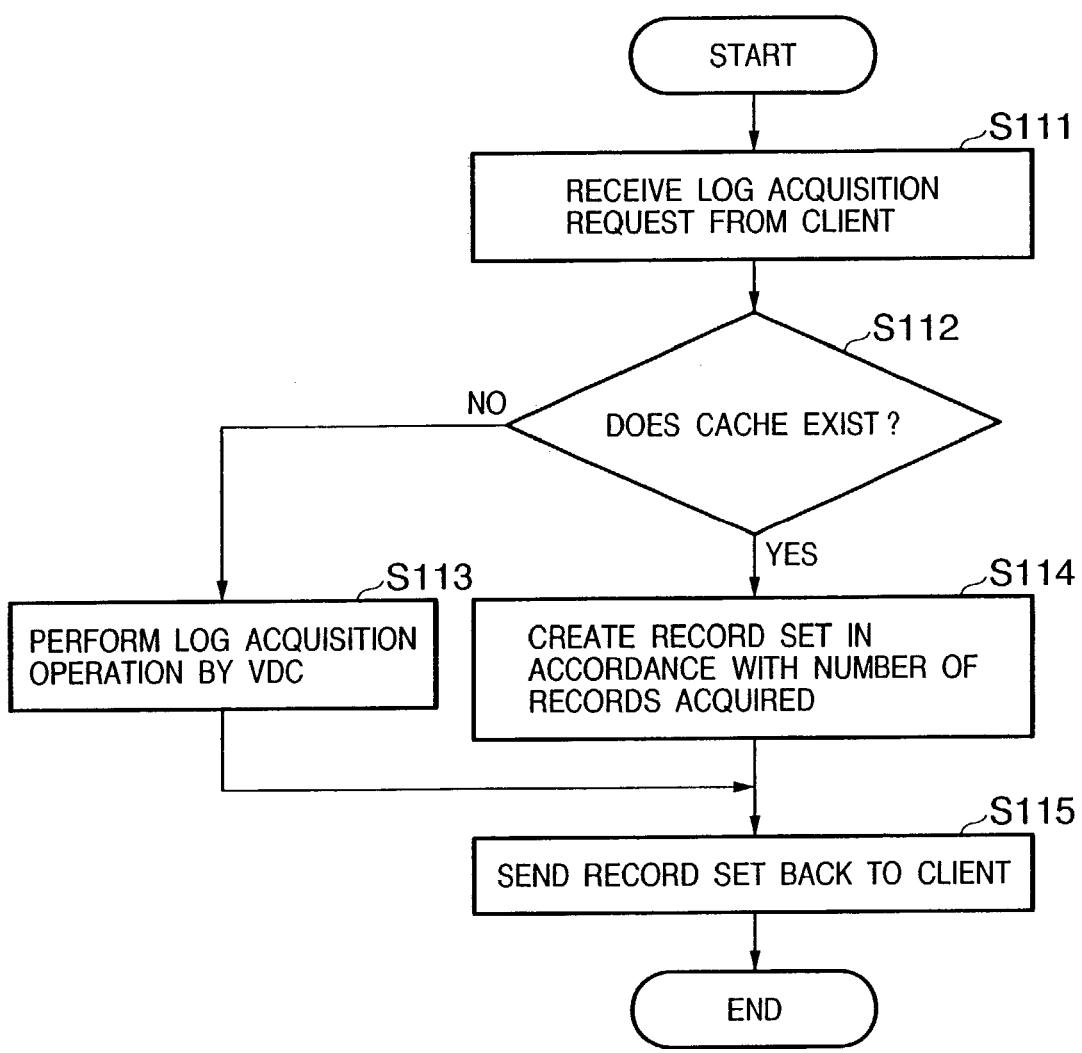
FIG. 11 is a flowchart useful in describing the procedure of operation by a VDC when a log-information acquisition request is issued by a client.

FIG. 11 is a flowchart useful in describing the procedure of operation by the VDC when a log-information acquisition request is issued by a client.

As shown in FIG. 11, first the VDC receives the log-information acquisition request from the client (step S111). Next, the VDC determines whether a cache exists (step S112).

If the result of the determination is that a cache exists ("YES" at step S112), then the VDC creates a set of records in accordance with the number of records acquired (step S114). If the result of the determination is that a cache does not exist ("NO" at step S112), on the other hand, then the VDC acquires log information from the device in accordance with the operation of the VDC for acquiring log information from the device (FIG. 5) (step S113). After the operation at step S113 or S114, the VDC sends the record set back to the client (step S115). At this time the client changes the display of the application in accordance with the record set sent back.

Described next will be the details of operation performed by the network management software GUI and VDC for acquiring event information and log information relating to a managed device.

Figure 12:
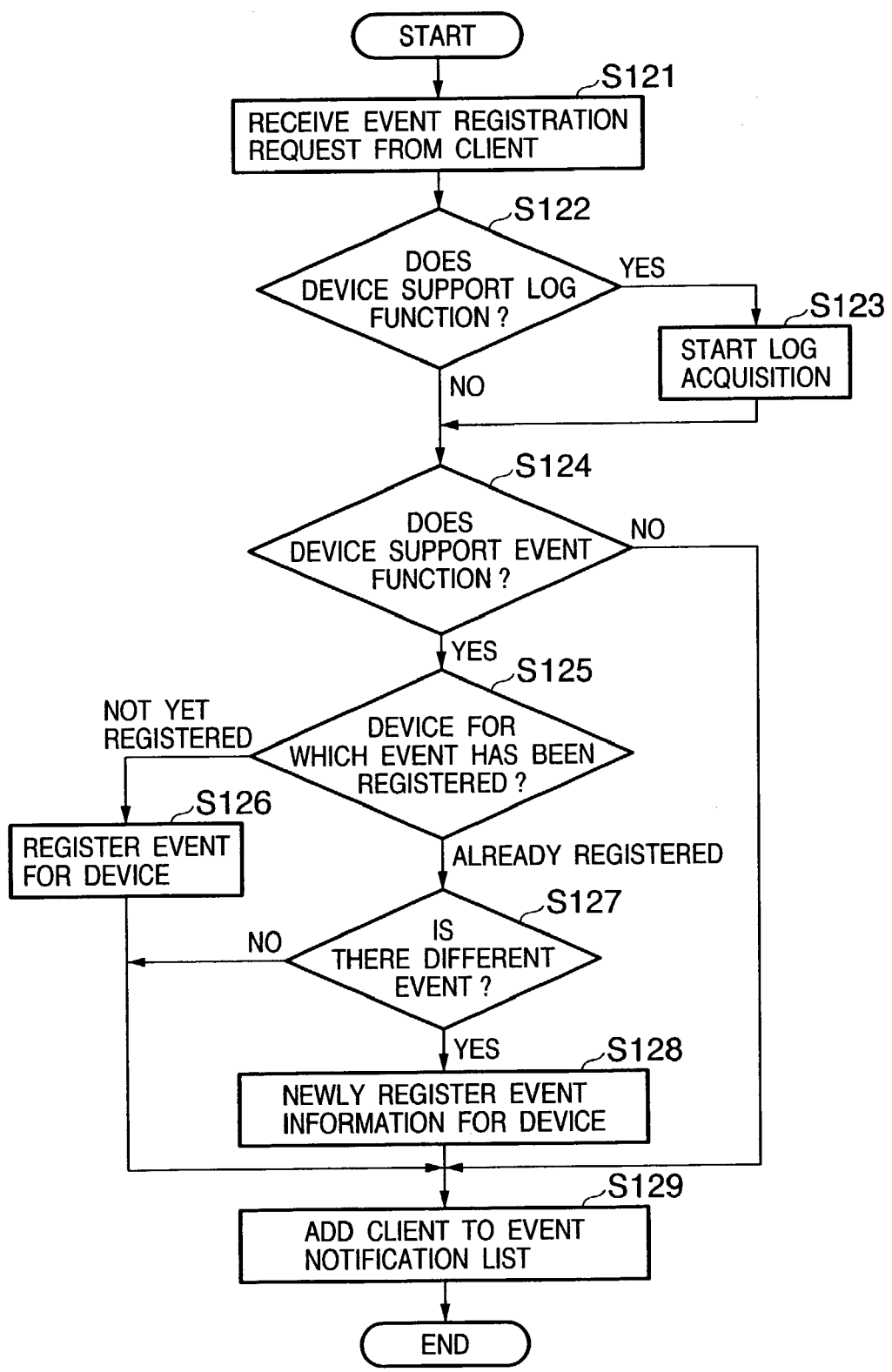
FIG. 12 is a flowchart useful in describing an operation for registering event information in a VDC.

FIG. 12 is a flowchart useful in describing an operation for registering event information by a VDC. First, the VDC receives a request for registration of event information from the network management software GUI (step S121). Next, the VDC determines whether the device that is the destination for registration of the event information supports the log function (step S122).

If the result of the determination is that the device supports the log function ("YES" at step S122), then the VDC starts acquisition of log information from the device (step S123). In accordance with the number of log items capable of being held within the device, the VDC periodically acquires the log information held by the device. If the result of the determination is that the device does not support the log function ("NO" at step S122), on the other hand, or if acquisition of the log information started at step S123, then the VDC determines whether the device supports the event function (step S124).

If the result of the determination is that the device does not support the event function ("NO" at step 124), then the network management software GUI (client) that requested registration of the event information is registered in an event-information notification list (step S129). If the result of the determination is that the device supports the event function ("YES" at step 124), on the other hand, then the VDC determines whether the device is one for which registration of the event information has already been performed (step S125).

If the result of the determination is that event information has not yet been registered for this device, then registration of event information is performed for this device (step S126). If the result of the determination is that registration of event information has been performed for this device, then the VDC determines whether there is different event information (e.g., event type or event property, etc.) (step S127). If the determination is that there is different event information ("YES" at step S127), then event information is registered anew for this device (step S128). The network management software GUI (client) that requested registration of event information is registered in the event-information notification list (step S129). If the determination is that there is no different event information ("NO" at step S127), then the network management software GUI (client) that requested registration of event information is registered in the event-information notification list (step S129).

Figure 13:
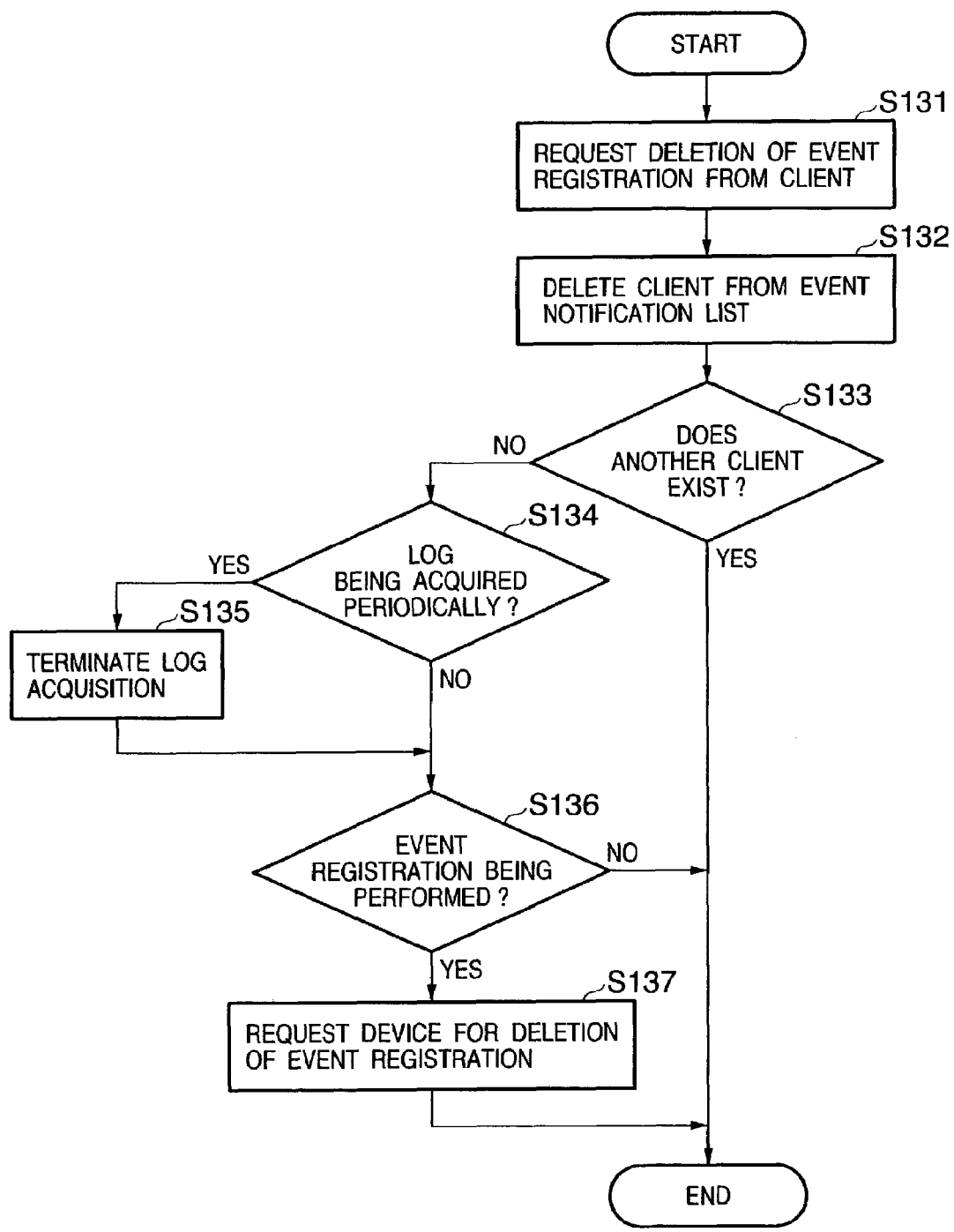
FIG. 13 is a flowchart useful in describing an operation for deleting registered event information in a VDC.

FIG. 13 is a flowchart useful in describing an operation for deleting registered event information in a VDC. First, the VDC receives a request for deletion of registered event information from the network management software GUI (step S131). Next, the VDC deletes the network management software GUI (client) from the event-information notification list (step S132).

Furthermore, it is determined whether there is another network management software GUI (client) that reports event information of a device being managed by the client that issued the delete request (step S133). If the result of the determination is that another network management software GUI (client) exists ("YES" at step S133), the VDC terminates deletion processing. If the result of the determination is that another network management software GUI (client) does not exist ("NO" at step S133), on the other hand, then it is determined whether the VDC is acquiring log information periodically from the device (step S134).

If the result of the determination is that the VDC is acquiring log information periodically ("YES" at step S134), then the operation for acquiring the log information is terminated (step S135). If the result of the determination is that the VDC is not acquiring log information periodically ("NO" at step S134), or if processing for terminating acquisition of log information is performed at step S135, then the VDC determines whether registration of event information has been carried out with respect to the device (step S136). If the result of determination is that registration of event information has been carried out ("YES" at step S136), then the VDC requests the client for deletion of event-information registration (step S137). If the result of determination is that registration of event information has not been carried out ("NO" at step S136), on the other hand, the VDC terminates registration.

Figure 14:
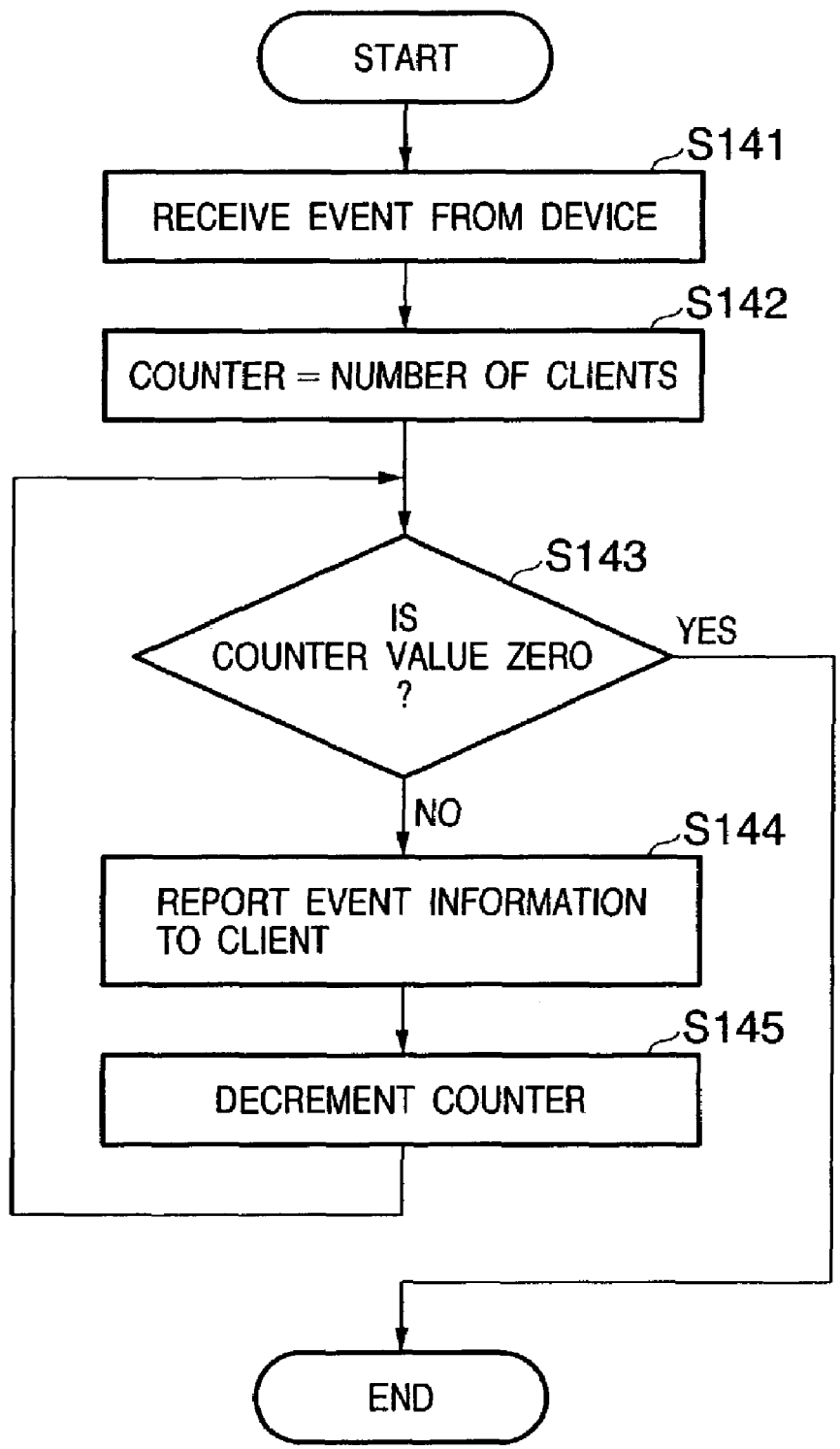
FIG. 14 is a flowchart useful in describing processing in a case where a VDC acquires event information from a managed device and notifies the GUI of network management software of the event information.

FIG. 14 is a flowchart useful in describing processing in a case where a VDC acquires event information from a managed device and notifies the network management software GUI of the event information.

First, the VDC acquires event information from the managed device (step S141). Next, the VDC sets an internal counter to the number of network management software GUIs (number of clients) to be notified of client information (step S142) and determines whether the value in the counter is zero (step S143). If the result of the determination is that the count is zero ("YES" at step S143), the VDC terminates processing. If the result of the determination is that the count is not zero ("NO" at step S143), on the other hand, then the VDC reports the event information to the network management software GUI (client) (step S144). The VDC subsequently decrements the value in the counter (step S145) and returns control to the processing of step S143.

Figure 15:
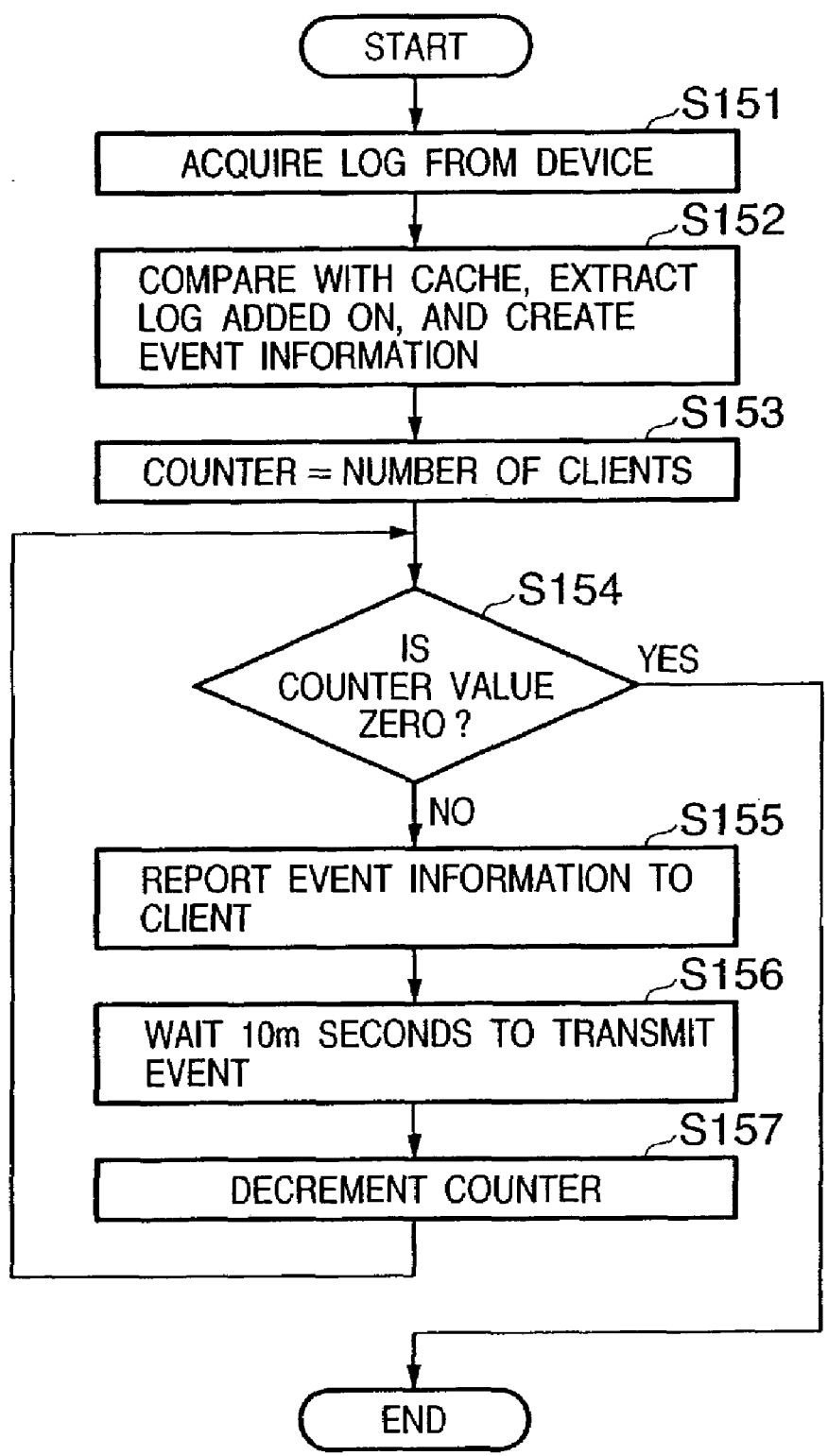
FIG. 15 is a flowchart useful in describing processing in a case where event information is created from log information that a VDC has acquired from a managed device and the event information is distributed to a client.

FIG. 15 is a flowchart useful in describing processing in a case where event information is created from log information that a VDC has acquired from a managed device and the event information is distributed to a client.

First, the VDC acquires log information from the device under management (step S151). Next, the VDC compares the acquired log information and cached log information, extracts only log information newly added on in the managed device and converts this log information to event information (step S152).

Furthermore, the VDC sets an internal counter to the number of network management software GUIs (number of clients) to be notified of event information (step S153) and determines whether the value in the counter is zero (step S154). If the result of the determination is that the count is zero ("YES" at step S154), the VDC terminates processing. If the result of the determination is that the count is not zero ("NO" at step S154), on the other hand, then the VDC reports the created event information to the network management software GUI (client) (step S155).

In this embodiment, it is so arranged that transmission of event information to the network management software GUI (client) is performed not immediately but upon elapse of a predetermined period of time (e.g., 10 s) (step S156). This processing for queuing transmission of event information is executed for the purpose reducing the load of process-to-process communication. This is achieved because event information is created by the internal operation of the VDC based upon the log information and transmission of the event information to the client is carried out successively in a short period of time. The VDC decrements the counter value (step S157) and returns control to the processing of step S154.

In general, there is the possibility that communication of the event information from the device carried out using UDP packets will experience loss of such packets owing to network failure, etc. However, the precision with which completion of a job is communicated to the network management software GUI (client) is improved by transmitting event information indicative of job end through joint use of log information that employs TCP in communicating with the device.

Furthermore, owing to the fact that the VDC behaves as a virtual device that handles reporting of event information by unifying three types of sensing methods relating to job completion, namely sensing based upon acquisition of event information, sensing based upon acquisition of log information and sensing based upon joint use of event information and log information, only the reporting of event information can be executed by the network management software GUI (client) regardless of the type of device. Further, the network management software GUI receives a small quantity of event information and does not periodically acquire a large quantity of log information. This makes it possible to reduce the traffic of process-to-process communication.

The details of the internal operation performed by the network management software GUI (client) will now be described.

Figure 16:
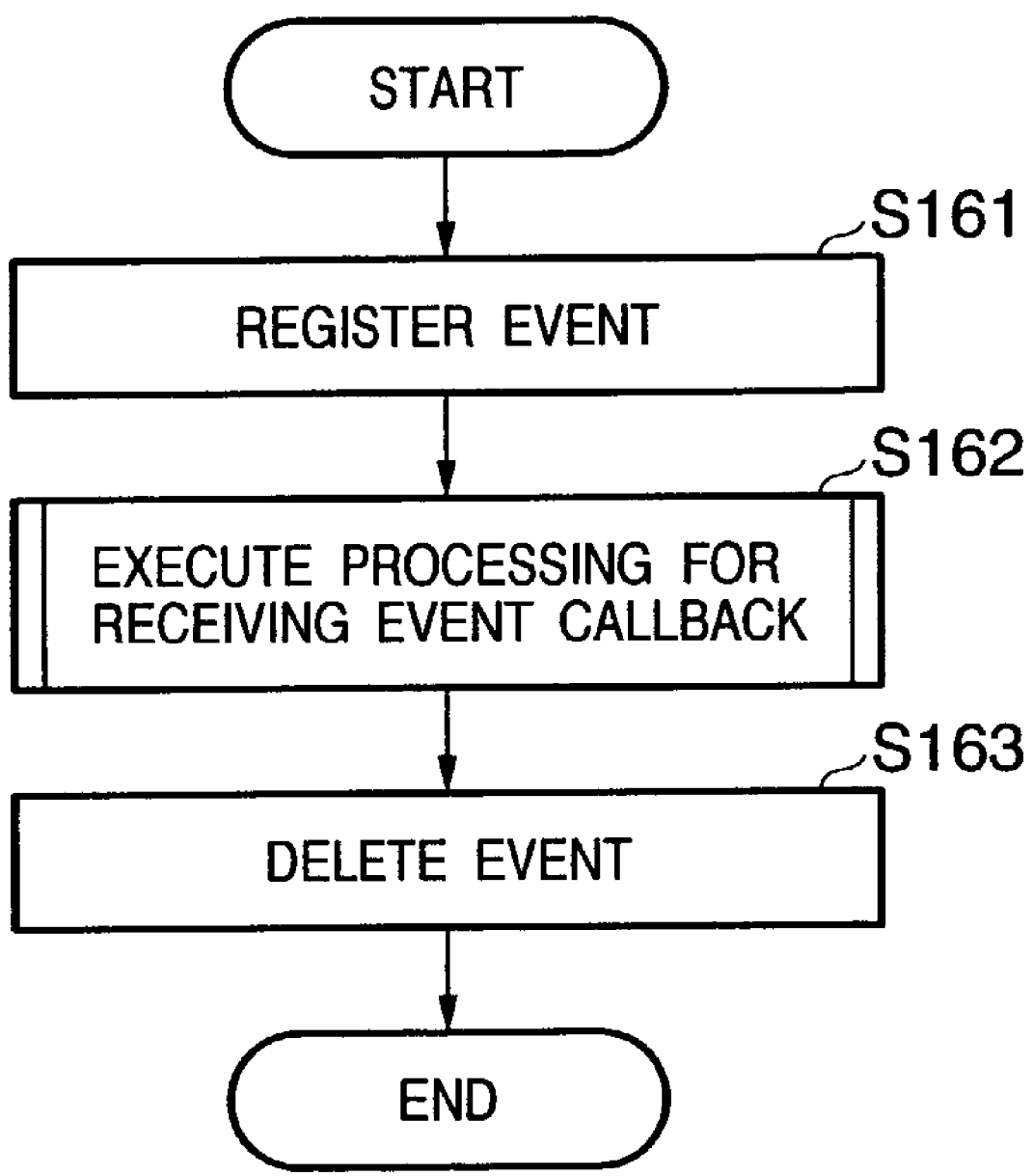
FIG. 16 is a flowchart useful in describing processing in a case where a client registers and deletes event information with respect to a VDC.

FIG. 16 is a flowchart useful in describing processing in a case where a client registers and deletes event information with respect to a VDC.

First, the client performs registration of event information, which is executed by processing that follows, with regard to the VDC (step S161). Examples of event information registered include the address of the client, an identifier (GUID) for uniquely identifying the client, client type indicating the type of event information, and event properties indicating attribute information classified by event.

Further, a device event and a job event are examples of event types. Examples of event properties are job owner, job name and job status, which are attributes of a job event. Next, the network management software GUI executes processing for receiving event callback (step S162). The client then deletes registered event information (step S163).

Described next will be processing for receiving event callback by the network management software GUI performed at step S162.

Figure 17:
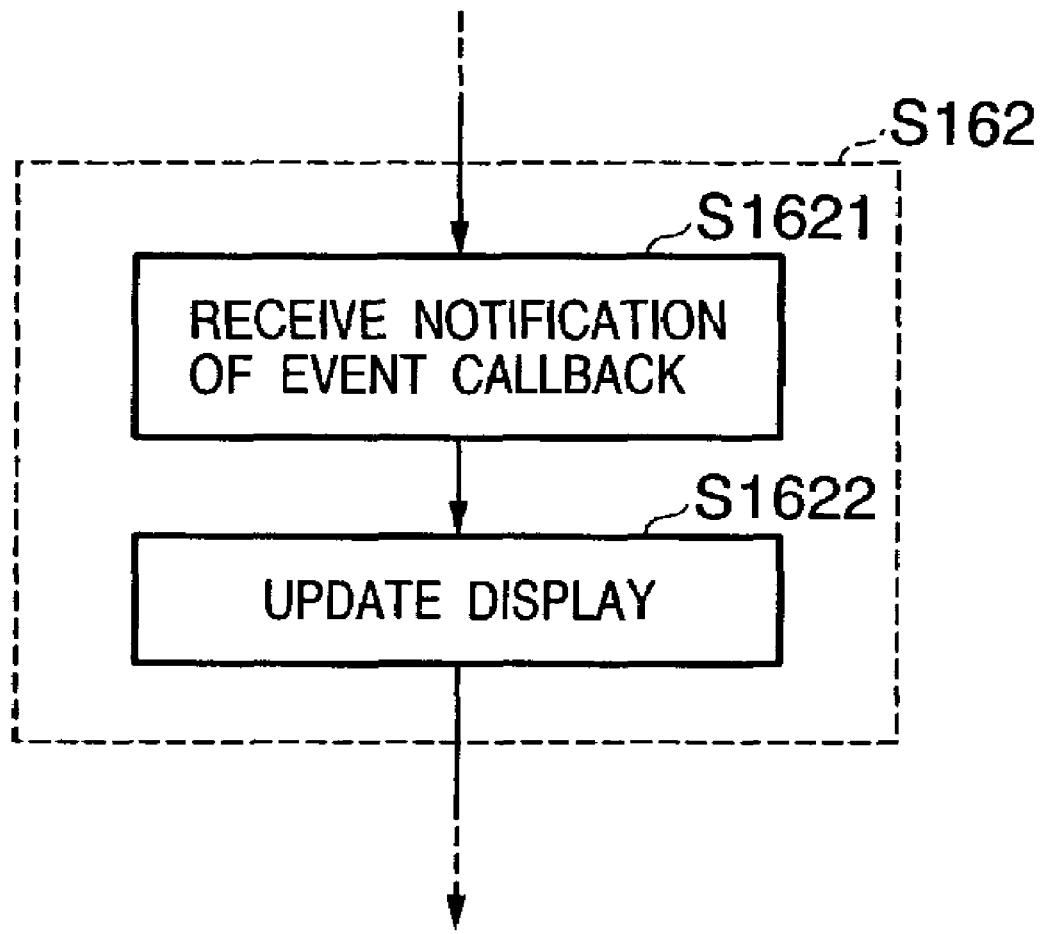
FIG. 17 is a flowchart useful in describing processing in a case where a client receives event callback from a VDC.

FIG. 17 is a flowchart useful in describing processing in a case where a client receives event callback from a VDC.

The client receives notification of event callback from the VDC (step S1621). Next, the client updates the display based upon the notification received (step S1622). The above-described FIG. 4 is a diagram illustrating the application when a job event has been received. This is an example of the display presented on the client side. In a case where a job completion event has been received, a character string indicating the job status in FIG. 4 is changed from "NOW PRINTING" to "ALREADY PRINTED" at the client.

As described above, the present invention provides a group of devices, which are providing different methods of sensing completion of a print job, with a single event-based method of sensing completion of a print job. An effect of the present invention is that a client application is capable of performing a simple operation without being aware of the type of device. Further, in a device that supports both event information and log information, completion of a print job is sensed making joint use of event information and log information. This has the effect of improving the precision with which the completion of a print job is sensed.

Furthermore, the present invention is such that instead of the client application periodically acquiring log information involving a great amount of data, log information is converted to event information, which involves less data in comparison with the log information, in the server application. This has the effect of reducing traffic in process-to-process communication.

The present invention can be applied to a system constituted by a plurality of devices (e.g., a host computer, interface, reader, printer, etc.) or to an apparatus comprising a single device (e.g., a copier or facsimile machine, etc.).

Furthermore, it goes without saying that the object of the invention is attained also by supplying a recording medium (or storage medium) storing the program codes of the software for performing the functions of the foregoing embodiment to a system or an apparatus, reading the program codes with a computer (e.g., a CPU or MPU) of the system or apparatus from the recording medium, and then executing the program codes. In this case, the program codes read from the recording medium implement the novel functions of the embodiment, and the recording medium storing the program codes constitutes the invention. Further, besides the case where the aforesaid functions according to the embodiment are implemented by executing the program codes read by a computer, it goes without saying that the present invention covers a case where an operating system or the like running on the computer performs a part of or the entire process in accordance with the designation of program codes and implements the functions according to the embodiment.

It goes without saying that the present invention further covers a case where, after the program codes read from the recording medium are written in a function expansion card inserted into the computer or in a memory provided in a function expansion unit connected to the computer, a CPU or the like contained in the function expansion card or function expansion unit performs a part of or the entire process in accordance with the designation of program codes and implements the function of the above embodiment.

In a case where the present invention is applied to the above-described recording medium, program code corresponding to the flowcharts described earlier is stored on the recording medium.

Thus, in accordance with the present invention, as described above, the operation performed by a client application can be simplified and the traffic in process-to-process communication can be reduced.

The present invention is not limited to the above embodiments and various changes and modifications can be made within the spirit and scope of the present invention. Therefore, to apprise the public of the scope of the present invention, the following claims are made.

What is claimed is:

1. A network device management system comprising a client apparatus, a server apparatus and at least one device separated from the client apparatus and the server apparatus, wherein said client apparatus comprises:
a processor and a memory;
requesting means for requesting said server apparatus to provide log information relating to a device;
storage means for storing the log information relating to the device acquired from said server apparatus; and
display means for displaying the log information stored in said storage means; and
wherein said server apparatus comprises:
a processor and a memory;
setting means for setting a request time interval of acquiring the log information from the device;
detection means for detecting whether or not the request time interval is set by the setting means;
decision means for determining whether or not the device is equipped with a hard disk, and for determining the capacity of the hard disk, if any;
determination means for determining, as a request time interval, one of first, second and third time intervals, where the first time interval is selected if said decision means determines that the device does not have a hard disk, the second time interval, which is longer than the first time interval, is selected if said decision means determines that the device has a hard disk and the capacity of the hard disk is less than a predetermined number, and the third time interval, which is longer than the second time interval, is selected if said decision means determines that the device has a hard disk and the capacity of the hard disk is equal to or more than the predetermined number, wherein the determination means determines the request time interval when the detection means detects that the request time interval is not set;
acquisition means for acquiring, from the device, log information that is held by the device, at time intervals equal to the request time interval set by the setting means when the detection means detects that the request time interval is set or determined by said determination means if the detection means detects that the request time interval is not set; and
transmitting means for transmitting log information acquired by said acquisition means to said client apparatus.

2. A control method for displaying information relating to a device connected on a network, comprising:
a display step of displaying, at a client apparatus, information relating to the device by a client apparatus;
a requesting step of the client apparatus requesting a server apparatus to provide log information relating to the device;
a setting step of setting a request time interval of acquiring the log information from the device;
a detection step of detecting whether or not the request time interval is set in the setting step;
a decision determination step, for determining whether or not the device is equipped with a hard disk, and determining the capacity of the hard disk;
an interval determination step, for determining, as a request time interval, one of first, second and third time intervals, where the first time interval is selected if the device does not have a hard disk, the second time interval, which is longer than the first time interval, is selected if the device has a hard disk and the capacity of the hard disk is less than a predetermined number, and the third time interval, which is longer than the second time interval, is selected if the device has a hard disk and the capacity of the hard disk is equal to or more than the predetermined number, wherein the determination step includes determining the request time interval when it is detected in the detection step that the request time interval is not set;

an acquisition step of the server apparatus acquiring, from the device, log information relating to the device, at time intervals equal to the request time interval set in the setting step when it is detected in the detection step that the request time interval is set or determined in said interval determination step if it is detected in the detection step that the request time interval is not set; and a transmitting step of transmitting log information from the server apparatus to the client apparatus.

3. The method according to claim 2, further comprising a selecting step of selecting a protocol, which can be used to acquire log information, based upon a log function of the device.

4. The method according to claim 2, wherein the server apparatus has temporary storage means for storing acquired log information temporarily, and wherein said transmitting step includes transmitting, to the client apparatus, only such log information, from among newly acquired log information, as updates log information that has been stored in the temporary storage means.

5. The method according to claim 2, wherein said acquisition step includes acquiring log information at respective request time intervals decided in said interval determination step, with respect to respective ones of a plurality of devices.

6. The method according to claim 2, wherein said acquisition step includes acquiring log information relating to the device based upon type of format of log information held by the device.

7. A computer-readable medium storing a program, in executable form, for managing information relating to a device connected on a network, said program functioning as the following means:

setting means for setting a request time interval of acquiring the log information from the device;

detection means for detecting whether or not the request time interval is set by the setting means;

decision means for determining whether or not the device is equipped with a hard disk, and for determining the capacity of the hard disk;

determination means for determining, as a request time interval, one of first, second and third time intervals, where the first time interval is selected if said decision means determines that the device does not have a hard disk, the second time interval, which is longer than the first time interval, is selected if said decision means determines that the device has a hard disk and the capacity of the hard disk is less than a predetermined number, and the third time interval (which is longer than the second time interval) is selected if said decision means determines that the device has a hard disk and the capacity of the hard disk is equal to or more than the predetermined number, wherein the determination means determines the request time interval when the detection means detects that the request time interval is not set;

acquisition means for acquiring, from the device, log information that is held by the device, at time intervals equal to the request time interval set by the setting means when the detection means detects that the request time interval is set or determined by said determination means if the detection means detects that the request time interval is not set; and transmitting means for transmitting log information acquired by said acquisition means, in response to a request from an external unit.

8. A server apparatus for displaying information relating to a device connected on a network, said server apparatus comprising:

a processor and a memory;

receiving means for receiving a request for log information relating to the device from a client apparatus;

setting means for setting a request time interval of acquiring the log information from the device;

detection means for detecting whether or not the request time interval is set by the setting means;

decision means for determining whether or not the device is equipped with a hard disk, and for determining the capacity of the hard disk;

determination means for determining, as a request time interval, one of first, second and third time intervals, where the first time interval is selected if said decision means determines that the device does not have a hard disk, the second time interval, which is longer than the first time interval, is selected if said decision means determines that the device has a hard disk and the capacity of the hard disk is less than a predetermined number, and the third time interval (which is longer than the second time interval) is selected if said decision means determines that the device has a hard disk and the capacity of the hard disk is equal to or more than the predetermined number, wherein the determination means determines the request time interval when the detection means detects that the request time interval is not set;

acquisition means for acquiring, from the device, log information that is held by the device, at time intervals equal to the request time interval set by the setting means when the detection means detects that the request time interval is set or determined by said determination means if the detection means detects that the request time interval is not set; and transmitting means for transmitting the log information to the client apparatus, wherein the client apparatus displays the log information received from the server apparatus.

9. A network device management system comprising a client apparatus and a server apparatus, wherein said client apparatus comprises:

a processor and a memory;

requesting means for requesting said server apparatus to provide log information relating to a device;

storage means for storing the log information relating to the device acquired from said server apparatus; and display means for displaying the log information stored in said storage means; and wherein said server apparatus comprises:

a processor and a memory;

setting means for setting a request time interval of acquiring the log information from the device;

detection means for detecting whether or not the request time interval is set by the setting means;

decision means for determining a capacity of a hard disk which the device is equipped with;

determination means for determining, as a request time interval, one of first and second time intervals, where the first time interval is selected if said decision means determines that the capacity of the hard disk is less than a predetermined number, and the second time interval, which is longer than the first time interval, is selected if said decision means determines that the capacity of the hard disk is equal to or more than the predetermined number, wherein the determination means determines the request time interval when the detection means detects that the request time interval is not set;

acquisition means for acquiring, from the device, log information that is held by the device, at time intervals equal to the request time interval set by the setting means when the detection means detects that the request time interval is set or determined by said determination means if the detection means detects that the request time interval is not set; and transmitting means for transmitting log information acquired by said acquisition means to said client apparatus.

10. A control method for displaying information relating to a device connected on a network, comprising:

a display step of displaying, at a client apparatus, information relating to the device by a client apparatus;

a requesting step of the client apparatus requesting a server apparatus to provide log information relating to the device;

a setting step of setting a request time interval of acquiring the log information from the device;

a detection step of detecting whether or not the request time interval is set in the setting step;

a decision step, for determining a capacity of a hard disk which the device is equipped with;

a determination step, for determining, as a request time interval, one of first and second time intervals, where the first time interval is selected if the capacity of the hard disk is less than a predetermined number, and the second time interval, which is longer than the first time interval, is selected if the capacity of the hard disk is equal to or more than the predetermined number, wherein the determination step includes determining the request time interval when it is detected in the detection step that the request time interval is not set;

an acquisition step of the server apparatus acquiring log information relating to the device at the request time interval set in the setting step when it is detected in the detection step that the request time interval is set or determined in said determination step if it is detected in the detection step that the request time interval is not set; and a transmitting step of transmitting log information from the server apparatus to the client apparatus.

11. A computer-readable medium storing a program, in executable form, for managing information relating to a device connected on a network, said program functioning as the following means:

setting means for setting a request time interval of acquiring the log information from the device;

detection means for detecting whether or not the request time interval is set by the setting means;

decision means for determining a capacity of a hard disk which the device is equipped with;

determination means for determining, as a request time interval, one of first and second time intervals, where the first time interval is selected if said decision means determines that the capacity of the hard disk is less than a predetermined number, and the second time interval, which is longer than the first time interval, is selected if said decision means determines that the capacity of the hard disk is equal to or more than the predetermined number, wherein the determination means determines the request time interval when the detection means detects that the request time interval is not set;

acquisition means for acquiring, from the device, log information that is held by the device, at time intervals equal to the request time interval set by the setting means when the detection means detects that the request time interval is set or determined by said determination means if the detection means detects that the request time interval is not set; and transmitting means for transmitting log information acquired by said acquisition means to a client apparatus.

12. A server apparatus for displaying information relating to a device connected on a network, said server apparatus comprising:

a processor and a memory;

receiving means for receiving a request for log information relating to the device from a client apparatus;

decision means for determining a capacity of a hard disk which the device is equipped with;

setting means for setting a request time interval of acquiring the log information from the device;

detection means for detecting whether or not the request time interval is set by the setting means;

decision means for determining a capacity of a hard disk which the device is equipped with;

determination means for determining, as a request time interval, one of first and second time intervals, where the first time interval is selected if said decision means determines that the capacity of the hard disk is less than a predetermined number, and the second time interval, which is longer than the first time interval, is selected if said decision means determines that the capacity of the hard disk is equal to or more than the predetermined number, wherein the determination means determines the request time interval when the detection means detects that the request time interval is not set;

acquisition means for acquiring, from the device, log information that is held by the device, at time intervals equal to the request time interval set by the setting means when the detection means detects that the request time interval is set or determined by said determination means if the detection means detects that the request time interval is not set; and transmitting means for transmitting log information acquired by said acquisition means to the client apparatus.

* * * * *